US012755010B2

(12) United States Patent
Srinivasan et al.

(10) Patent No.: US 12,755,010 B2
(45) Date of Patent: Oct. 6, 2026

(54) ARTIFICIAL INTELLIGENCE-DRIVEN DATA RECOVERY AND CYBERSECURITY

(71) Applicant: GE Precision Healthcare LLC, Waukesha, WI (US)

(72) Inventors: Nivedha Srinivasan, Bangalore (IN); Mouleeswaran Kumar, Chennai (IN)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 12 days.

(21) Appl. No.: 18/897,340

(22) Filed: Sep. 26, 2024

(65) Prior Publication Data

US 2026/0087129 A1 Mar. 26, 2026

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .......................... G06F 21/554; G06F 2221/034
See application file for complete search history.

(56) References Cited

U.S. PATENT DOCUMENTS 12,438,917 B1 * 10/2025 Ananthakrishnan .... H04L 63/20
2024/0370339 A1 * 11/2024 Statton ................ G06F 11/1458
2025/0211603 A1 * 6/2025 Qi ........................ G06N 3/0455
2026/0089187 A1 * 3/2026 Lei ...................... H04L 63/1416

OTHER PUBLICATIONS

Naqvi, et al "Adaptive Immunity for Software: Towards Autonomous Self-healing Systems" arXiv:2101.02534v1 [cs.SE] Jan. 7, 2021, 5 pages.
Zhao, et al. "Empowering Large Language Model Agents through Action Learning" arXiv:2402.15809v2 [cs.AI] Aug. 8, 2024, 19 pages.
Akyurek, et al. "Towards Tracing Factual Knowledge in Language Models Back to the Training Data" arXiv:2205.11482v3 [cs.CL] Oct. 25, 2022, 18 pages.
Yang, et al. "Auto-GPT for Online Decision Making: Benchmarks and Additional Opinions" arXiv:2306.02224v1 [cs.AI] Jun. 4, 2023, 14 pages.

(Continued)

*Primary Examiner* — Sangseok Park
(74) *Attorney, Agent, or Firm* — Amin, Turocy & Watson, LLP

(57) ABSTRACT

One or more systems, devices, computer program products and/or computer-implemented methods of use provided herein relate to AI-driven data recovery and cybersecurity. In various embodiments, a system can be provided. The system can comprise a memory that can store computer executable components. The system can further comprise a processor that can execute the computer executable components stored in the memory, where the computer executable components can comprise a detection component that can detect an anomaly caused by a cyberattack. The computer executable components can further comprise an isolation component that can isolate, based on detection of the anomaly, one or more computing systems affected by the cyberattack.

20 Claims, 10 Drawing Sheets

(56) References Cited

OTHER PUBLICATIONS

Podlodowski, et al. "Application of XGBoost to the cyber-security problem of detecting suspicious network traffic events" 2019 IEEE International Conference on Big Data (Big Data), Dec. 9-12, 2019, 7 pages.

Raghgunath, et al. "XGBoost Regression Classifier (XRC) Model for Cyber Attack Detection and Classification Using Inception V4" Journal of Web Engineering, vol. 21, Issue 4, 2022, 27 pages.

* cited by examiner

ARTIFICIAL INTELLIGENCE-DRIVEN DATA RECOVERY AND CYBERSECURITY

BACKGROUND

The subject disclosure relates to cybersecurity and, more specifically, to an artificial intelligence (AI)-driven data recovery and cybersecurity.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that enable AI-driven data recovery and cybersecurity are discussed.

According to an embodiment, a system is provided. The system can comprise a memory that can store computer executable components. The system can further comprise a processor that can execute the computer executable components stored in the memory, where the computer executable components can comprise a detection component that can detect an anomaly caused by a cyberattack. The computer executable components can further comprise an isolation component that can isolate, based on detection of the anomaly, one or more computing systems affected by the cyberattack.

According to another embodiment, a computer-implemented method is provided. The computer-implemented method can comprise detecting, by a system operatively coupled to a processor, an anomaly caused by a cyberattack. The computer-implemented method can further comprise isolating, by the system, based on the detecting, one or more computing systems affected by the cyberattack.

According to yet another embodiment, a computer program product is provided. The computer program product can comprise a non-transitory computer readable memory having program instructions embodied therewith, the program instructions executable by a processor to cause the processor to detect an anomaly caused by a cyberattack. The program instructions can be further executable by the processor to cause the processor to isolate, based on detection of the anomaly, one or more computing systems affected by the cyberattack.

BRIEF DESCRIPTION OF THE DRAWINGS

One or more embodiments are described below in the Detailed Description section with reference to the following drawings.

DETAILED DESCRIPTION

Figure 1:
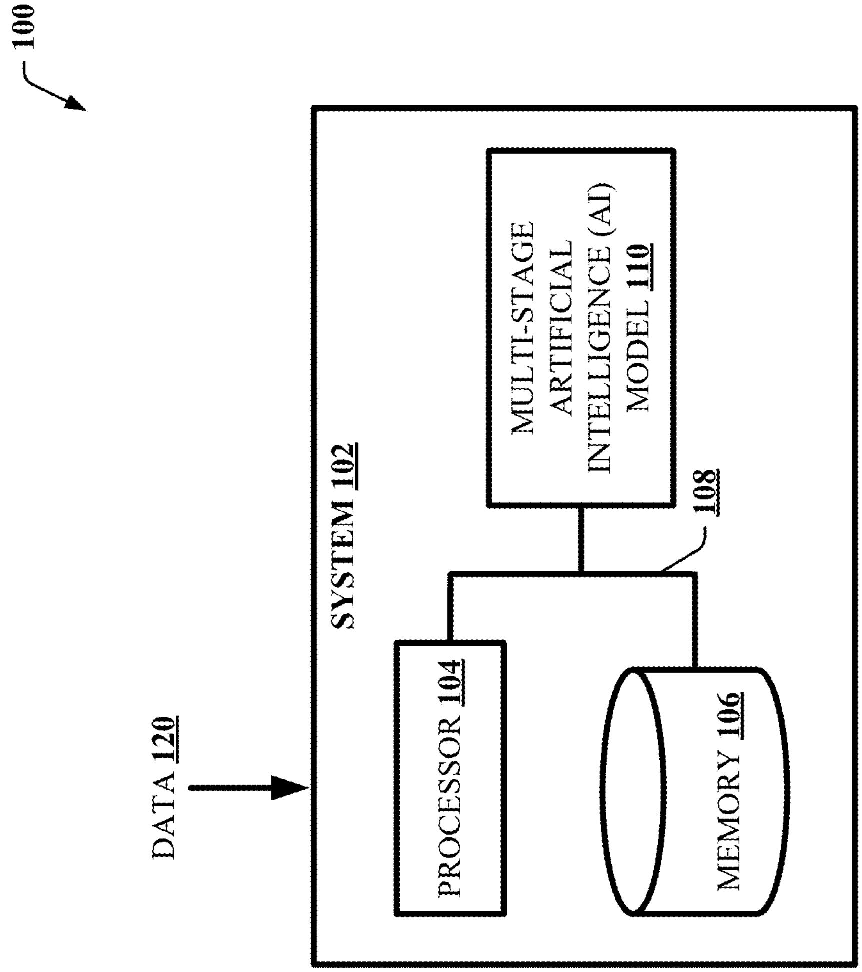
FIG. 1 illustrates a block diagram of an example, non-limiting system that can detect cyberattacks and perform a data recovery mechanism upon detection of the cyberattacks in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The healthcare industry continues to wrestle with scarce data defenses and data salvage mechanisms in the face of escalating, sophisticated and ever advancing cyberattacks such as ransomware or other types of malwares. Cyberattacks often target critical medical systems that deliver patient care, thereby compromising the safety of patients and patient data. Additionally, medical devices currently installed in hospitals utilize software that lack the range of actions that can safeguard patient data and medical systems from internal and external cyberattacks, do not guarantee the availability of medical services and compliance with healthcare regulations, and often miss the mark in terms of maintaining confidentiality and integrity of patient data and proper operations of medical systems. As a result, there have been several incidents in the recent past where patient data has been encrypted. For example, the recent hacking of the servers at the All India Institute of Medical Science (AIIMS) resulted in the encryption of about 1 tera byte (TB) of sensitive patient data. Such incidents serve as examples showcasing the lack of disaster recovery features within conventional/traditional medical system architectures. Disaster recovery refers to the policies, procedures and/or tools that can be implemented by organizations to recover from disruptions caused by events such as cyberattacks, data breaches, etc. to their Information Technology (IT) infrastructure. Moreover, there does not exist a data recovery program other than the cloud environment, and most of the devices deployed on-premises (on-prem) do not comprise a data recovery mechanism. Thus, the only backup data available for system recovery in case of a cyberattack includes patient data or the Digital Imagining and Communications in Medicine (DICOM®) data; however, such data is not available for the entire recovery system.

Conventional cybersecurity systems also involve manual data backups and data recoveries. For example, data is ordinarily backed up to local storage or traditional cloud solutions without sophisticated encryptions or verification mechanisms with involvement from IT staff at organizations. Moreover, manual identification of all affected IT systems via human intervention (e.g., by IT staff) to isolate the IT systems and initiate a data recovery process in the event of a cyberattack can be significantly time-consuming and error prone. Additionally, existing cybersecurity systems implement and employ basic security measures such as standard security protocols of firewalls, anti-virus software, and simple intrusion detection systems. The access controls can also typically depend on the traditional password mechanisms with no real-time monitoring (e.g., continuous monitoring over time for cyber threats and cyberattacks) or advanced threat detection. As a result, threat mitigation is slowed down due to the incident response to a detected cyber threat or cyberattack being dependent on manual log analysis and human decision-making. Thus, the implementation of more effective, autonomous and versatile cybersecurity systems can be desirable.

Various embodiments of the present disclosure can be employed to produce a solution to these problems. Embodiments described herein include systems, computer-implemented methods, and computer program products that provide intelligent AI-driven disaster recovery and cybersecurity. The various embodiments herein can be especially application to healthcare data management. However, it should be appreciated that the various embodiments herein can also be employed in other domains such as finance, banking, etc.

In various embodiments, a disaster recovery system is provided for medical devices or other healthcare related systems, wherein the disaster recovery system can address critical challenges, such as cyberattacks faced by healthcare organizations, that threaten the confidentiality, integrity and availability (CIA) of data. For example, in various embodiments, the system architecture of the disaster recovery system can comprise AI-assisted intelligent backup and recovery capabilities based on which the system can execute automated data backups and data recovery processes of Protected Health Information (PHI) in events of system failures or cyberattacks. In one or more embodiments, the AI-assisted intelligent backup and recovery capabilities of the system can be specifically designed for clinical care environments or other environments and can ensure data protection and complete recovery of electronic PHI (ePHI). Therefore, the disaster recovery system can also ensure continuity of clinical care and patient safety.

More specifically, in one or more embodiments, a multi-stage artificial intelligence (AI) model can be provided. The multi-stage AI model can perform AI-driven data backups and data recovery processes, wherein the multi-stage AI model can integrate a central AI model (e.g., the ChatGPT-4o model) and large language model (LLM) agents with and without machine learning algorithms (e.g., Extreme Gradient Boosting (XGBoost) algorithms, also called XGBoost models). The LLM agents can be employed under direct supervision of the central AI model for automatic data backup and data recovery in the event of cyber threats and cyber attacks. For example, the LLM agents can comprise LLM agents assisted by the central AI model (e.g., the ChatGPT-4o model), LLM agents assisted by the machine learning algorithms (e.g., XGBoost algorithms) and headless LLM agents, each of which can be directly supervised by the central AI model. The central AI model can also supervise and orchestrate the operations of other components comprised in multi-stage AI model for automated detection of cyberattacks and the subsequent data recovery processes. In one or more embodiments, the LLM agents can continuously monitor data traffic over the network, system logs, and activities of entities (e.g., hardware, software, machine, AI and/or user) by employing either the headless LLM agents directly controlled by the central AI model or LLM agents equipped with specialized XGBoost algorithms. Based on the monitoring, the LLM agents and the machine learning algorithms can detect an anomaly caused by a cyberattack, unauthorized access attempts, etc., and in response to detection of the anomaly, the LLM agents can isolate computing systems potentially affected by the cyberattack. Thereafter, the LLM agents can trigger immediate recovery of the computing systems from securely encrypted backup data. The data recovery process can be preceded by data verification, wherein the Retrieval-Augmented Generation (RAG) mechanism provided a set of AI models can be employed to verify the integrity of backup data and ensure that the backup data has not been corrupted or tampered with. The RAG mechanism can further ensure secure data access. Upon verification of the integrity of the backup data, the computing systems affected by a cyber threat and/or cyber attack can be restored based on the backup data and the restored systems can be further validated to ensure seamless operations.

Thus, the various embodiments herein can integrate and combine AI technologies and large language models (LLMs) for a more efficient data recovery process in the event of a cyberattack, wherein LLMs identify anomalies, break down the data into chunks and plan or orchestrate the recovery mechanism. Additionally, the various embodiments herein implement advanced security measures and a unique (e.g., first in the arcade) and proactive approach to disaster recovery and self-healing of computing system, for example, in a healthcare organization or organizations in other domains, by employing predictive techniques that provide enhanced security and efficiency, reduce manual intervention, minimize system downtimes, lower operational costs and improve patient safety, integrity and confidentiality. Accordingly, the various embodiments herein can provide the following customer and patient benefits when employed in health care organizations:

Rapid Recovery and Continuity of Operations: In various embodiments, a rapid data backup and data recovery process can be controlled/orchestrated and implemented by the multi-stage AI model based on backup data in case of cyber threats and/or cyberattacks. As a result, organizations employing the multi-stage AI model within their systems can rapidly regain access to and begin deploying critical IT systems and IT infrastructure after a cyberattack is detected. Thus, instant recovery and continuity of operations is enabled by the various embodiments herein, rather than, for example, halting system operations within a medical center until the system operations can return to normal status.

Enhanced capabilities of emergency responders in saving lives: As stated elsewhere herein, the multi-stage AI model can minimize system downtime and ensure that critical systems/systems having prime significance can remain operational in the event of a cyber threat and/or a cyberattack. Additionally, the multi-stage AI model can improve the efficiency of healthcare workers and optimize resources. For example, automation of data backup and data recovery processes can limit the involvement of human beings, and healthcare staff can devote time towards the treatment of patients rather than towards IT-related problems.

Secure data accessibility: In various embodiments, a secure data infrastructure can be provided that can allow entities such as, for example, health care professionals, to securely access critical information for everyday/routine activities and emergency situations. For example, the secure data infrastructure can ensure that patient data and PHI are secure, and that patient data is not encrypted at any cost. Even if the patient data is encrypted, the anomaly detection feature via the LLM agents can identify the cyber threats/encryptions and execute suitable actions at the correct time to ensure that the encryptions do not spread across the entire system.

Business continuity assurance: In various embodiments, the multi-stage AI model can assist with safeguarding critical business operations by ensuring that such operations can be recovered with minimal or no interruption.

Medical product integrity and security: In various embodiments, the multi-stage AI model can ensure that the operating conditions of medical products/devices are good by prohibiting unauthorized access to the medical products/devices. This can further improve the security and confidentiality associated with IT systems and data integrity and compliance with regulations such as Health Insurance Portability and Accountability Act (HIPAA).

Defense against cyber threats: In various embodiments, the multi-stage AI model can protect healthcare institutions against cyberattacks that disrupt patient care and cause system outages and exposure of sensitive data.

In terms of autonomous responses to cyberattacks, conventional healthcare approaches towards data recovery during disasters such as cyberattacks typically advocate for massive manual intervention in detecting and recovering from cyberattacks. On the contrary, the various embodiments herein can integrate XGBoost algorithms and ChatGPT-4o-assisted LLMs agents that can detect, respond to, and mitigate cyber threats in real-time. The autonomous responses thus initiated can lead to fast actions, minimal downtime, and uninterrupted continuity of clinical care, unlike the slow and error-prone conventional approaches. Additionally, most existing solutions tend to respond to cyber threats after the occurrence of the cyber threats, resulting in increased possibilities of system failures and data breaches. On the contrary, the various embodiments herein can emphasize proactive cyber threat analysis and mitigation by employing XGBoost algorithms to predict and mitigate risks even before system operations are affected by cyber threats and/or cyberattacks. For example, the predictive capabilities provided by the various AI models employed in the various embodiments herein can detect potential cyber threats in advance and enable proactive cyber threat mitigation. This can ensure a very resilient and secure IT environment, for example, for healthcare operations. Thus, the possibility of disrupting a system can be reduced, and the overall system reliability and patient safety can be enhanced.

Conventional methods are typically also implemented via generic restoration algorithms that do not consider context details during cyber threat and/or cyberattack events. On the contrary, the various embodiments herein enable context-aware data recovery processes, wherein a RAG mechanism can be employed to produce application-dependent and context-specific restoration plans based on historical data series, system logs, and external knowledge. This can ensure efficient restoration of data, which can significantly minimize the time for restoration of systems as well as lost data. Conventional cybersecurity solutions often involve significant human intervention for error detection, incident response, and system recovery. On the contrary, the various embodiments herein involve minimal human intervention, which can be enabled via integration of advanced AI technologies that enable autonomous operations and eliminate the need for continuous human oversight. As a result, the various embodiments herein can reduce the risks associated with human error, speed up response times in case of cyber threats and cyber attacks, and allow healthcare professionals to focus on patient care rather than IT issues. Minimizing the amount of human intervention involved in disaster recovery procedures can also provide economic advantages to organizations and businesses by reducing the medical device downtime. The various embodiments herein can ensure timely and high-level patient care that can provide further economic advantages to organizations and businesses.

Lastly, most conventional cybersecurity solutions fail at being scalable or adaptable to changing healthcare environments and increasing volumes of data. On the contrary, the cybersecurity systems described in the various embodiments herein can be designed for scalability and adaptability to ensure seamless integration of such systems with existing IT infrastructures and to ensure evolution of the systems to meet changed needs. For example, the cybersecurity systems presented in various embodiments can be potentially integrated as services into the Edison™ Health Link platform of General Electric HealthCare (GEHC). Additionally, the feedback mechanisms and automatic updates provided by the various embodiments herein can ensure long-term sustainability and effectiveness. Thus, embodiments of the present disclosure can provide a cybersecurity system that can be safer (e.g., via proactive monitoring of data to ensure minimal downtime of critical devices), accurate (e.g., via context-aware remediation strategies through RAG and by being less prone to human errors), faster (e.g., by autonomously recovering data without human intervention, minimizing downtime and maximizing uptime), and cost-effective (e.g., by reducing operational costs to ensure clinical continuity) than conventional systems.

The embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 100 as illustrated at FIG. 1, and/or systems thereof, can further comprise, be associated with and/or be coupled to one or more computer and/or computing-based elements described herein with reference to an operating environment, such as the operating environment 900 illustrated at FIG. 9. For example, non-limiting system 100 can be associated with, such as accessible via, a computing environment 900 described below with reference to FIG. 9, such that aspects of processing can be distributed between non-limiting system 100 and the computing environment 900. In one or more described embodiments, computer and/or computing-based elements can be used in connection with implementing one or more of the systems, devices, components and/or computer-implemented operations shown and/or described in connection with FIG. 1 and/or with other figures described herein.

FIG. 1 illustrates a block diagram of an example, non-limiting system 100 that can detect cyberattacks and perform a data recovery mechanism upon detection of the cyberattacks in accordance with one or more embodiments described herein.

Non-limiting system 100 and/or the components of non-limiting system 100 can be employed to use hardware and/or software to solve problems that are highly technical in nature (e.g., related to AI-driven data recovery, AI-driver cybersecurity, backup data management, etc.), that are not abstract and that cannot be performed as a set of mental acts by a human. Further, some of the processes performed may be performed by specialized computers for carrying out defined tasks related to the AI-driven data recovery and cybersecurity. Non-limiting system 100 and/or components of non-limiting system 100 can be employed to solve new problems that arise through advancements in technologies mentioned above and/or the like. Non-limiting system 100 can provide technical improvements to cybersecurity systems by reducing the amount of manual intervention involved in detecting a cyberattack and preventing the spread of the cyberattack, increasing the speed of incident responses in case of cyberattacks and minimizing the system downtime caused by responding to cyberattacks and restoring computing systems affected by the cyberattacks.

In contrast to the embodiments of the present disclosure, existing cybersecurity systems are associated with the disadvantages of prolonged system downtime, data loss, increased human error and availability of limited proactive measures. For example, manual cybersecurity processes can generate significant system downtimes for organizations in case of a ransomware attack or any other cyberattack incident. Manual intervention can also increase the potential for incomplete data recovery, which can lead to loss of sensitive data (e.g., sensitive patient data). Human involvement in backup and recovery processes can also imply a higher potential of errors being introduced within such processes, and manual threat detection being much slower and less reliable than AI-driven threat detection (e.g., such as provided by the various embodiments herein) can cause critical cybersecurity events to go unnoticed. Existing cyber security systems provide no predictive capabilities to foresee, minimize or neutralize cyber threats before they impact operations, and cybersecurity and data recovery with reactive approaches can make a system more vulnerable.

Non-limiting system 100 can also provide the following advantages:

AI-driven disaster recovery and continuity: In one or more embodiments, a ChatGPT-4o model can be employed as a core or central model, LLM agents can be employed to execute tasks, and XGBoost algorithms can be employed to detect an anomaly, and ensure a speedy recovery of one or more computing systems affected by a cyberattack, continuity of regular operations of the one or more computing systems and low system downtime after detection of the cyberattack, for example, in terms of healthcare related or other types of operations and services provided by the one or more computing systems. As a result, patient care, customer support, etc. can be safeguarded.

Improved data integrity and security: In one or more embodiments, multi-stage AI model 110 can validate integrity of backup data via the RAG mechanism, undertake real-time threat analysis via the XGBoost algorithms, and safely backup and restore data affected by a cyberattack via the LLM agents, while ensuring data integrity, confidentiality, and security from cyber threats.

Automated incident response and containment: The multi-stage AI model can also coordinate automated incident responses by employing the ChatGPT-4o model, executing containment measures via the LLM agents, and providing an impact analysis report generated via the XGBoost algorithms. This can drastically reduce manual intervention and increase incident response speeds.

Business continuity and system availability: A medical system or another system employing multi-stage AI model 110 can remain available for continuous operation owing to intelligent data backups performed by the LLM agents, predictive analysis performed via the XGBoost algorithms, and system recovery coordinated by the ChatGPT-4o model with very minimal interruptions of services.

Cost-effective and efficient operations: The multi-stage AI model can ensure cost-effective disaster recovery solutions for healthcare institutions by automating the data backup, data recovery, and threat detection processed by employing AI models that can reduce labor costs and operational inefficiencies.

Proactive threat mitigation and risk reduction: Embodiments of the present disclosure can proactively mitigate cyber threats through continuous data monitoring via LLM agents, instant analysis by XGBoost algorithms, and generating strategic incident responses via the ChatGPT-4o model, thereby greatly reducing risks associated with cyberattacks.

Scalable and flexible system architecture: Multi-stage AI model 110 can be designed as a scalable and adaptable system that can seamlessly integrate with existing healthcare IT infrastructure. Additionally, multi-stage AI model 110 can evolve through continuous learning and updates by the algorithms employed by multi-stage AI model 110 to address new challenges related to cyber threats and cyberattacks.

In various embodiments, non-limiting system 100 can comprise system 102. Discussion turns briefly to processor 104, memory 106 and bus 108 of system 102. For example, in one or more embodiments, system 102 can comprise processor 104 (e.g., computer processing unit, microprocessor, classical processor, and/or like processor). In one or more embodiments, a component associated with system 102, as described herein with or without reference to the one or more figures of the one or more embodiments, can comprise one or more computer and/or machine readable, writable and/or executable components and/or instructions that can be executed by processor 104 to enable performance of one or more processes defined by such component(s) and/or instruction(s).

In one or more embodiments, system 102 can comprise a computer-readable memory (e.g., memory 106) that can be operably connected to processor 104. Memory 106 can store computer-executable instructions that, upon execution by processor 104, can cause processor 104 and/or one or more other components of system 102 (e.g., multi-stage AI model 110, detection component 202, LLM agents 204, machine learning algorithms 206, isolation component 208, validation component 210, set of AI models 212, training component 214 and/or central AI model 216) to perform one or more actions. In one or more embodiments, memory 106 can store computer-executable components (e.g., multi-stage AI model 110, detection component 202, LLM agents 204, machine learning algorithms 206, isolation component 208, validation component 210, set of AI models 212, training component 214 and/or central AI model 216).

System 102 and/or a component thereof as described herein, can be communicatively, electrically, operatively, optically and/or otherwise coupled to one another via bus 108. Bus 108 can comprise one or more of a memory bus, memory controller, peripheral bus, external bus, local bus, and/or another type of bus that can employ one or more bus architectures. One or more of these examples of bus 108 can be employed. In one or more embodiments, system 102 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of system 102 can reside in the cloud, and/or can reside locally in a local computing environment (e.g., at a specified location(s)).

Figure 2:
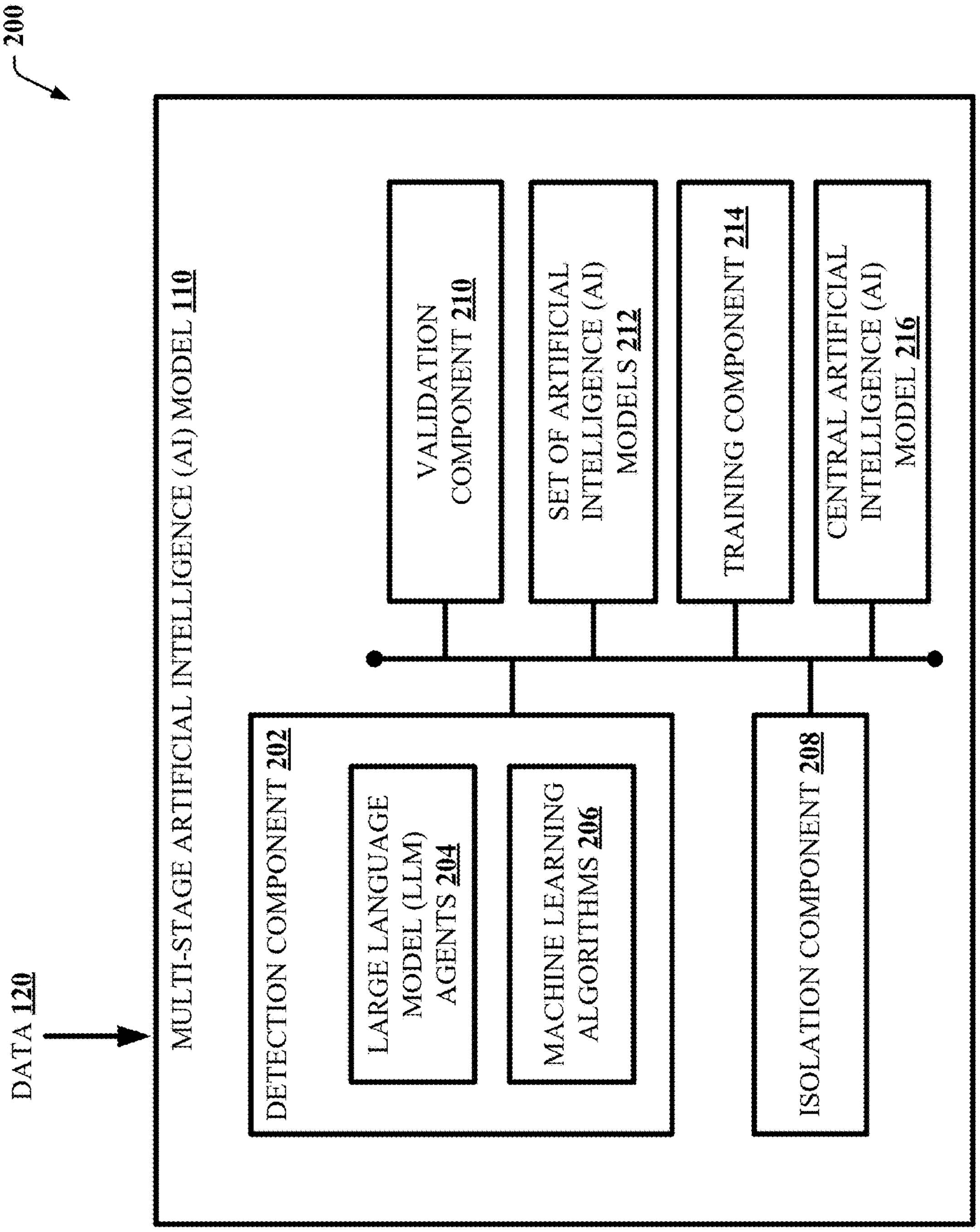
FIG. 2 illustrates another block diagram of an example, non-limiting system that can detect cyberattacks and perform a data recovery mechanism upon detection of the cyberattacks in accordance with one or more embodiments described herein.

In various embodiments, system 102 can comprise multi-stage AI model 110. As illustrated in FIG. 2, multi-stage AI model 110 can further comprise detection component 202, isolation component 208, validation component 210, training component 214 and central AI model 216. In various embodiments, detection component 202 can comprise LLM agents 204 and machine learning algorithms 206. Multi-stage AI model 110 can have a scalable and flexible architecture, and multi-stage AI model 110 can be employed in a medical device (e.g., a computed tomography (CT) device, a magnetic resonance (MR) device, a radiology device for women's health, etc.), a set of medical devices or another suitable system inside a healthcare facility such as a hospital, clinic, laboratory, etc. For example, system 102 can be employed for cyber security of imaging platforms or other platforms. However, it should be appreciated that the application of system 102 is not restricted to specific medical devices or the healthcare domain, and the various embodiments described herein can have widespread usability across medical devices, across non-healthcare devices, and within a variety of organizations and businesses.

In various embodiments, system 102 can employ multi-stage AI model 110 to detect cyberattacks and prevent new cyberattacks. The workflow and operations executed by multi-stage AI model 110 to detect and prevent cyberattacks can be generally divided into six segments, namely, system monitoring and cyber threat detection, data backup mechanism, incident response and containment, data recovery process, system recovery and validation, and continuous improvement, each of which is described in greater detail in the following paragraphs. As such, each segment (i.e., system monitoring and cyber threat detection, data backup mechanism, incident response and containment, data recovery process, system recovery and validation, and continuous improvement) can represent a stage within the workflow, wherein output data generated by one stage can be employed as input data by another stage within the workflow to produce various outcomes. Additionally, each stage can involve the processing of data by one or more AI models and/or machine learning models. Thus, multi-stage AI model 110 can represent an AI model comprising multiple stages of AI models and/or machine learning models that can be employed towards the detection and prevention of cyberattacks.

System Monitoring and Cyber Threat Detection

Under this segment, LLM Agents 204 can monitor data 120, and machine learning algorithms 206 can detect anomalies based on the monitoring. For example, ChatGPT4o-based custom-built LLM agents can continuously monitor network traffic, entity behavior as well as system logs comprised in data 120. Additionally, XGBoost-based LLM agents can analyze data collected during the monitoring to instantly root-out anomalies and possible cyber threats. For example, in various embodiments, detection component 202 can detect an anomaly caused by a cyberattack. Detection component 202 can employ LLM agents 204 and machine learning algorithm 206 to detect the anomaly. For example, in various embodiments, LLM agents 204 can perform a security audit, wherein LLM agents 204 can continuously monitor data 120 comprising network traffic, system logs and system access activities for one or more computing systems in a network (e.g., IT infrastructure network). Further, machine learning algorithms 206 can detect the anomaly by analyzing data generated during the security audit.

In various embodiments, detection component 202, LLM agents 204, machine learning algorithms 206, isolation component 208, validation component 210, set of AI models 212, training component 214 and the operations performed by these components can be controlled by central AI model 216. In this regard, central AI model 216 can serve as the brain of multi-stage AI model 110 and ensure that all processes that are organized and undertaken by multi-stage AI model 110 can conform to the intended decision-making tasks at any given time. In one or more embodiments, the ChatGPT-4o model (or central model, ChatGPT-4o central model) can be employed as central AI model 216. Further, in one or more embodiments, respective machine learning algorithms comprised in machine learning algorithms 206 can be respective XGBoost algorithms. XGBoost algorithms can be employed for precise anomaly detection, impact analysis, and integrity checking of operations that can be chained together at multiple stages of the workflow described herein for predictive analytics. In various embodiments, LLM agents 204 can comprise three types of LLM agents or submodules, namely, context-separate and ChatGPT-4o-assisted LLM agents, XGBoost-assisted LLM agents, and headless LLMs containing only tools, and LLM agents 204 can monitor data 120 via the different submodules. Respective submodules comprised in LLM agents 204 can perform different respective actions. As such respective submodules comprised in LLM agents 204 can be assigned different respective actions by central AI model 216. Additionally, the submodules of LLM agents 204 can ensure that the ChatGPT-4o model executes the correct actions, thereby further ensuring that disaster management and data recovery operations are correctly executed in the event of a cyberattack.

In various embodiments, LLM agents 204 can operate under direct supervision of central AI model 216. For example, LLM agents 204 can perform operations based on direct commands from the ChatGPT-4o model. For example, the question "When did the last medical center ransomware attack occur in India?" can be input by an entity (e.g., hardware, software, machine, AI, neural network and/or user) into ChatGPT-4o, for example, via the user interface (UI) of a device (e.g., smartphone, tablet, laptop, desktop computer, etc.). ChatGPT-4o can forward the query to LLM agents 204 at the backend, wherein the submodules comprised by LLM agents 204 can respectively execute planning, data acquisition, and data streamlining operations at the backend, followed by forwarding the streamlined data to the UI. Additionally, the submodules can continue to perpetually monitor the network traffic, entity behavior, and data logs. Based on the monitoring, the XGBoost algorithms can detect the anomaly. For example, the XGBoost algorithms can be trained (e.g., by training component 214) to understand the network traffic at any given time and to identify what anomalous network traffic can look like. Given the training data, the XGBoost algorithms can validate whether a network traffic is anomalous by identifying a change (e.g., delta) in the network traffic.

In various embodiments, LLM agents 204 can detect, based on the detection of the anomaly, one or more cyberattack activities causing the anomaly. In this regard, system 102 can be integrated with RAG, wherein a database comprising historical data related to prior incidents of cyber threats, cyberattacks, etc. can be queried to enhance cyber threat detection and provide better response recommendations. RAG is a technique that combines retrieval-based and generation-based models to improve the quality of responses in natural language processing (NLP) tasks. For example, given a query, a retrieval module can identify and extract relevant information from a large database, and a generation module can generate coherent and contextually relevant responses based on the query and the information retrieved by the retrieval module. In various embodiments, RAG can improve a data retrieval capacity of system 102 for easy querying and validation against historical incident data accessible to/stored in system 102 (e.g., in memory 106). In various embodiments, RAG can be provided by the set of AI models 212. Accordingly, LLM agents 204 can map an anomaly to any historical incidents of cyber threats, cyberattacks, etc. via the set of AI models 212. In response to an anomaly being mapped to one or more historical incidents, a mechanism for automated data retrieval from backup data can be initiated via the data backup mechanism and the incident response and containment operations.

In various embodiments, in addition to the historical incidents of cyberattacks, the database employed by the RAG mechanism provided by the set of AI models 212 can be augmented with potential cyberattack scenarios that can occur. Thus, both historical and potential incidents of cyberattacks can be employed by detection component 202 (e.g., via LLM agents 204) to map an anomaly to a cyberattack. In this regard, RAG can also be implemented as a continuous and on-the-fly learning mechanism in the various embodiments herein. For example, data from historical incidents of cyber threats and/or cyberattacks related to a healthcare environment can be stored by the set of AI models 212 in the database. The set of AI models 212 can access and collect such customer side data from a hospital, clinic, laboratory, etc. However, a potential solution to a cyberattack can also be determined based on scenarios that may not have been previously handled by LLM agents 204 (e.g., scenarios previously unseen by LLM agents 204). Thus, the set of AI models 212 can access data from potential incidents of cyberattacks and continuously feed such data to the RAG mechanism, which can enable LLM agents 204 to become tuned to the expectations of the RAG mechanism in detecting similar attacks in the future.

Data Backup Mechanism

As previously described, a data backup mechanism based on RAG can be triggered in response to detection of anomalies and the corresponding cyberattacks, wherein the data backup mechanism can restore the one or more computing systems affected by a cyberattack to a healthy/secure state. For example, in various embodiments, machine learning algorithms 206 can analyze an impact of the cyberattack on the one or more computing systems and generate an impact analysis report that highlights the impact of the cyberattack. In various embodiments, validation component 210 can validate, based on the impact analysis report, integrity of backup data. To validate the integrity of the backup data, validation component 210 can perform encrypted data backups with RAG verification.

More specifically, validation component 210 can validate the integrity of backup data via the set of AI models 212, wherein validation component 210 can employ the RAG mechanism to ensure that backup data is intact and not encrypted, for example, by some ransomware. To ensure the integrity of the backup data, the RAG mechanism can perform differencing (also known as diffing), wherein a snapshot of the backup data can be compared to previous snapshots of the backup data to identify any changes in the backup data. The validation process can further ensure that the encrypted storage comprising the backup data is at par with encryption standards. For example, the validation process can ensure that the backup data is encrypted with the Advanced Encryption Standard with a 256-bit key length (AES-256), stored safely and distributed in places as needed, based on the 3-2-1 rule of data redundancy. According to the 3-2-1 rule, three (3) copies of data comprising one copy of production data with two backups are stored on two (2) different types of media, with one (1) backup of data stored offsite with encryption. In various embodiments, the encrypted storage can be located on a hard backup or a disk integrated cloud backup to ensure that the backup data is not disrupted.

In many practical scenarios, anti-malware systems are typically implemented by organizations many months or even a year prior to the occurrence of a cyberattack. As a result, malware such as ransomware or a trojan horse may have already infected backup data, and employing such backup data to restore computing systems can be risky. For example, a trojan horse that has been implanted in a backup data system can gradually encrypt key data files or partially encrypt some of the content of the backup data. For example, if a file has about 150 lines of data, the trojan horse can gradually encrypt certain key items within 70-80 lines of the data. In this case, the data backup mechanism described herein can comprise an additional component known as a file veracity auditing mechanism. With the file veracity auditing mechanism, any minor change in the backup data can be intercepted by an algorithm. For example, the algorithm can have knowledge of the set of files comprised in the backup data, critical items in the entire backup data system, a files disk that should always be intact for a medical device to function accurately, etc. Accordingly, any change in encryption in any of the files or data comprised in the backup data can be intercepted by the algorithm, and the algorithm can generate an alert. In response to the alert, an automated restore of the backup data can be executed, wherein secondary backup data can be employed to restore the backup data affected by malware. However, the secondary backup data employed to restore the backup data can be associated with certain restrictions. For example, backup data can be restored from disconnected systems such as on-premises (on-prem) backups or from the cloud. For example, the backup data can be restored from a hard backup that can be accessed via a system that is not connected to the internet, since secondary backup data comprised in the hard backup can likely be inaccessible to a cyber attacker.

In various embodiments, LLM agents 204 can also perform regular and intelligent backups, wherein LLM agents 204 can manage scheduled and automated backups. To schedule full incremental backups, LLM agents 204 can employ a backup scheduler. The backup scheduler can be a mechanism whereby specialized XGBoost algorithms (e.g., machine learning algorithms 206) that drive optimization can assist in optimum predictions of critical windows for data backup as well as for prioritization of data. Employing such specialized XGBoost algorithms can provide flexibility in scheduling full and incremental backups. Additionally, the backup scheduler can be a completely configurable mechanism. For example, the backup scheduler can be configured according to the operations of the product or system that the backup scheduler is implemented within, and the backup scheduler can be planned according to a medical center or facility employing multi-stage AI model 110.

Incident Response and Containment

In various embodiment, in response to detection of a cyberattack, an automated incident response and containment procedure can be initiated, wherein an incident response can comprise issuing commands to LLM agents 204. As a result, a compromised system, for example, the one or more computing systems affected by the cyberattack, can be isolated and reverted to the original state. For example, as previously stated, LLM agents 204 can detect, based on the detection of the anomaly, one or more cyberattack activities causing the anomaly. In various embodiments, LLM agents 204 can further generate, based on detection of the one or more cyberattack activities, an alert. In various embodiments, isolation component 208 can isolate, based on detection of the anomaly, one or more computing systems affected by the cyberattack. For example, based on the alert, isolation component 208 can isolate the one or more computing systems from additional computing systems in the network to prevent the cyberattack from spreading throughout the network. In one or more embodiments, isolation component can employ LLM agents 204 to isolate the one or more computing systems.

In various embodiments, the automated incident response and containment procedure to isolate the one or more computing systems can be initiated via central AI model 216. For example, in response to detection of the cyberattack the Chat-GPT4o model can coordinate actions or operations that other components of multi-stage AI model 110 can execute, wherein the ChatGPT-4o model can issue commands to LLM agents 204, based on which, isolation component 208 can immediately isolate the systems compromised by the cyberattack. In this regard, the ChatGPT-4o model and LLM agents 204 can represent an automated response engine that can make preordained response decisions if a cyber threat or cyberattack is detected. For example, one or more of LLM agents 204 can detect an anomaly, and a data recovery process can be orchestrated in response to detection of the anomaly, wherein the data recovery process can automatically restore/replace data encrypted or otherwise affected by the cyberattack from backup data. In various embodiments, isolation component 208 can employ insights from the XGBoost algorithms to execute the containment procedure via virtual patching and network segmentation. XGBoost algorithms can generate insights into the spread of the cyberattack and its impact. Thus, employing such insights can assist isolation component 208 to contain cyberattacks very effectively via virtual patching and network segmentation.

Data Recovery Process

In various embodiments, after validation of the integrity of the backup data and isolation of the one or more computing systems affected by the cyberattack, a data recovery process can be initiated by central AI model 216, wherein central AI model 216 can execute an AI-based coordinated recovery of the backup data via LLM agents 204. For example, the ChatGPT-4o model can control and coordinate LLM agents 204 for the actual recovery tasks, wherein the LLM agents 204 can execute a data recovery process based on the backup data, upon validation of integrity of the backup data by validation component 210. In various embodiments, the data recovery process can be executed by LLM agents 204 while minimizing operational disruptions caused by the cyberattack. Based on the data recovery process, LLM agents 204 can recover data affected by the cyberattack. Additionally, the ChatGPT-4o model can call upon the RAG mechanism to fetch the best restoration procedures. In various embodiments, the ChatGPT-4o model can additionally perform integrity verification of the backup data via XGBoost assisted LLM agents comprised in LLM agents 204, wherein the XGBoost assisted LLM agents can be employed to perform an automated integrity verification after recovering the backup data to ensure that tampering or corruption of the backup data has not occurred. In this regard, the ChatGPT-4o model can represent a recovery orchestrator that can handle data recovery and data sequencing based on dependency mapping to maintain order and consistency of operations, while employing XGBoost assisted LLM agents to check the integrity of the backup data.

System Recovery and Validation

In various embodiments, LLM agents 204 can restore the one or more computing systems to a healthy state upon recovery of the data affected by the cyberattack. For example, in various embodiments, after recovering the backup data, a system reboot with ChatGPT-4o oversight can be executed, wherein a gradual reboot and validation of the restored systems can be performed (e.g., by validation component 210) under the oversight of the ChatGPT-4o model through a process of comprehensive tests executed by LLM agents 204. As part of the validation, post-recovery testing can be performed via the RAG mechanism, wherein the restored computing systems can be compared (e.g., by validation component 210) with historical benchmarks for proper functionality and security. For example, in various embodiments, a system testing framework can be implemented wherein automated scripts can test the restored computing systems against operational standards before re-deploying the computing systems (i.e., making the systems go live/become accessible for regular use). Such validation can ensure that the post-recovery testing is complete and the benchmarks that indicate that the one or more computing systems are ready to use are met. Thus, the system testing framework can ensure that, upon recovering data from the data backup, computing systems affected by a cyberattack are thoroughly tested before re-deploying the computing systems, thereby ensuring that the computing systems are functional, instead of disrupting system operations that may have been functioning correctly prior to a cyberattack, for example, by employing backup data that may have been tampered with.

Continuous Improvement

In various embodiments, central AI model 216 (e.g., the ChatGPT-4o model) can execute a feedback loop, wherein new scenarios of cyber threats and cyberattacks can be stored in the database employed by the RAG mechanism provided by the set of AI models 212. For example, a cyberattack detected by detection component 202 can represent a scenario previously unknown to the set of AI models 212, and storing the cyberattack in the database can allow LLM agents 204 to more efficiently detect similar cyberattacks in the future, thereby continuously improving the performance of multi-stage AI model 110. In various embodiments, central AI model 216 can additional employ LLM agents 204 to collect and analyze incident data and system performance metrics to assist continuous monitoring of data 120 and the continuous improvement of multi-stage AI model 110.

Additionally, in various embodiments, training component 214 can apply regular model updates to central AI model 216, the ChatGPT-4o-assisted LLM agents comprised in LLM agents 204, and XGBoost algorithms comprised in machine learning algorithms 206, and training component 214 can apply updates to one or more other components comprised in multi-stage AI model 110 to improve cyber threat and cyberattack detection capabilities. As part of the model updates, training component 214 can regularly retrain the models (e.g., central AI model 216, LLM agents 204, machine learning algorithm 206) based on the most up to date data with respect to cyberattack incidents (e.g., latest cyberattack incident data) detected by detection component 202. Herein, training central AI model 216 can comprise fine-tuning central AI model 216 on diverse datasets to ensure that central AI model 216 can gain a solid understanding about giving commands to other components of multi-stage AI model 110 as part of the operations executed by multi-stage AI model 110. In various embodiments, training component 214 can also retrain the set of AI models 212.

Obtaining the training data employable to train central AI model 216 from customer data can be challenging, for example, because customers (e.g., healthcare facilities, businesses, etc.) are often not aware of how such data can be reserved for training. However, the training data can be generated by augmenting known cyber threat and cyberattack scenarios. For example, in various embodiments, given partial ransomware attacks or partial encryptions such as those caused by malware implanted in backup data, every change in data resulting from malicious encryptions by the malware can be identified, and such scenarios can be augmented. Additionally, a log describing how a ransomware attack or another type of cyberattack can be generated. Cyberattack scenarios can also be created internally within an organization, wherein some files can be intentionally corrupted or encrypted, backup data can be encrypted, and so on, and based on such augmented data, additional cyber threat and/or cyberattack scenarios can be simulated. The simulated scenarios can be employed to train central AI model 216 to make the model robust, especially if a training dataset cannot be obtained on site. In some embodiments, central AI model 216 itself can be employed to generate simulated scenarios of cyber threats and/or cyberattacks. For example, a ChatGPT model external to a medical device employing multi-stage model 110 can be queried to identify known global cyberattack techniques, and such techniques can be employed to learn or to generate new types of cyberattacks as well as solutions to mitigate the cyberattacks. The simulated data thus generated can be complied into new training data by training component 214 and employed to train central AI model 216.

In various embodiments, a dashboard can be provided as an extension of system 102, wherein the dashboard can be communicatively, operatively, optically and/or otherwise coupled to system 102. The dashboard can be employed by an entity (e.g., hardware, software, machine, AI, neural network and/or user), for example, to continually observe the processes and operations executed by multi-stage AI model 110 and/or to manually intervene at any stage. As such, the dashboard can display the health and status of a system (e.g., system 102), medical device, etc. employing multi-stage AI model 110, for example, in case of a cyberattack.

Multi-stage AI model 110 can have various practical applications as described further. In general, multi-stage AI model 110 can be employed in a system, wherein multi-stage AI model 110 can be tuned to PHI data. As such, every portion of key data, that is, critical data or critical portions of data comprised in every file of the system, can be internally tagged as critical data by multi-stage AI model 110. LLM agents 204 can continuously monitor the critical data to prevent interruptions in backup data and immediate actions can be executed when critical contents in the backup data are modified (e.g., file veracity auditing). Whenever an anomaly is detected by detection component 202, containment measures can be executed wherein one or more computing systems affected by the anomaly can remain on hold until the backup and restore operations executed by multi-stage AI model 110 are completed. However, during isolation of the computing systems and the subsequent data recovery process, the AI-based XGBoost algorithms can restore the affected computing systems to a usable state at the earliest, thereby minimizing system downtime.

Exemplary Applications

In an exemplary scenario, multi-stage AI model 110 can be employed for proactive system maintenance and risk reduction. For example, a magnetic resonance imaging (MRI) scanner can exhibit intermittent software glitches that can impact diagnostic accuracy and patient safety. The MRI scanner system can employ multi-stage AI model 110, and LLM agents 204 can continuously monitor operational logs and performance metrics of the MRI scanner. During the monitoring, LLM agents 204 can identify various types of anomalies indicating software malfunctions. In response to identification of the anomalies, the XGBoost algorithms (i.e., machine learning algorithms 206) can process all past error data and forecast possible software failures. Additionally, the ChatGPT-4o model (i.e., central AI model 216) can recommend pre-emptive actions, including software patching and updating of the firmware employed by the MRI scanner. The effectiveness of patches can be verified by the RAG mechanism provided by the set of AI models 212 to compare post-update performance of the MRI scanner system with historical benchmarks. Such proactive maintenance can ensure optimal performance of the MRI scanner, decrease the risk of diagnostic errors, promote patient safety, and reduce unplanned downtimes.

In another exemplary scenario, multi-stage AI model 110 can be employed to ensure an automated incident response and operational efficiency. For example, Radiology Department A in a hospital can experience a surge in incident reports due to imaging software conflicts and delays in diagnostic workflows. The imaging and diagnostic systems within the radiology department can employ multi-stage AI model 110 for cybersecurity purposes, and multi-stage AI model 110 can automate incident management by employing the ChatGPT-4o model and LLM agents 204 assisted by the ChatGPT-4o model and the XGBoost algorithms. LLM agents 204 can prioritize incidents based on severity and potential impact on patient care, and the ChatGPT-4o model can analyze incident descriptions to identify root causes based on which, the ChatGPT-4o model can recommend remediation steps. Further, the XGBoost algorithms can predict potential downstream effects of incidents and aid in efficient resource allocation. Thereafter, LLM agents 204 can execute corrective actions including, but not limited to, software updates, configuration changes and dependency resolutions. The automation within the process described herein can streamline incident resolution, reduce manual intervention, ensure continuous and efficient radiology operations and improve patient throughput.

Additional exemplary applications are described with reference to FIGS. 6 and 7.

FIG. 2 illustrates a block diagram of an example, non-limiting system 200 that can detect cyberattacks and perform a data recovery mechanism upon detection of the cyberattacks in accordance with one or more embodiments described herein. Repetitive description of like elements and/or processes employed in respective embodiments is omitted for sake of brevity.

Non-limiting system 200 illustrates the system of multi-stage AI model 110 and the components that can be employed in the system architecture of multi-stage AI model 110 to address challenges related to cyber threats, cyberattacks, data breaches, etc. As described with reference to FIG. 1, in various embodiments, multi-stage AI model 110 can comprise detection component 202, LLM agents 204, machine learning algorithms 206, isolation component 208, validation component 210, set of AI models 212, training component 214, and central AI model 216. In some embodiments, LLM agents 204 and machine learning algorithms 206 can be comprised within detection component 202. In other embodiments, LLM agents 204 and machine learning algorithms 206 can be located within multi-stage AI model 110 as components external to detection component 202. In one or more embodiments, machine learning algorithms 206 can be XGBoost algorithms, central AI model 216 can be the ChatGPT-4o model, and the set of AI models 212 can provide the RAG mechanism.

In various embodiments, multi-stage AI model 110 can employ the one or more components listed herein to detect a cyberattack based on an anomaly, stop the spread of the cyberattack throughout a network of computing systems by isolating one or more computing systems in the network affected by the cyberattack, and restore the one or more computing systems to a healthy state by replacing encrypted data with secure backups. The various embodiments herein can provide an AI-driven, automated, and real-time detection, response, and data recovery system that can be more efficient than conventional cyberattack detection and data recovery methods. For example, multi-stage AI model 110 can be employed to leverage state-of-the-art AI technologies such as the ChatGPT-4o model (e.g., central AI model 216), LLM agents 204, XGBoost algorithms (e.g., machine learning algorithms 206), and the RAG mechanism (e.g., via the set of AI models 212) to create or develop an end-to-end disaster recovery system/autonomous incident detection and response system for the healthcare sector, as described with reference to FIG. 1.

For example, multi-stage AI model 110 can integrate LLM agents 204 with the ChatGPT-4o model and employ XGBoost algorithms to predict potential cyber threats and/or cyberattacks based on historical data and continuous data mining. Further, multi-stage AI model 110 can employ RAG to validate the integrity of backup data employed to restore computing systems affected by a cyberattack and to optimize recovery of data affected by the cyberattack. RAG can leverage historical snapshots and external knowledge sources to generate context-sensitive recovery plans that can enable improved efficiency and effectiveness of the data recovery. As a result, the autonomous incident detection and response system provided by multi-stage AI model 110 can be scalable and adjustable for dynamic environments, such as dynamic healthcare environments, etc. Additionally, the autonomous incident detection and response system can integrate with any existing IT infrastructure, evolve to meet changing needs and incorporate feedback to ensure continuous improvement.

The various embodiments described herein can provide an efficient data recovery and cybersecurity system, contrary to conventional systems that are rigid, more reactive, time-consuming and/or that typically involve actions that are initiated by humans. For example, contrary to conventional systems that are rigid, the autonomous incident detection and response system provided by multi-stage AI model 110 can be a flexible system that can assure long-term sustainability. For example, the data recovery approach resulting from employing RAG can differ from conventional methods wherein the data recovery process is static and not too flexible. Further, the autonomous incident detection and response system can provide autonomous detection and mitigation of cyber threats, reduce the time that can be potentially consumed in responding to cyber threats and cyberattacks, reduce human errors, and provide speedy data recovery, thereby providing an independent cyber threat and cyberattack detection mechanism that can be unique in the global healthcare domain. Contrary to conventional systems that can be reactive, the autonomous incident detection and response system provided by multi-stage AI model 110 can ensure proactive anticipation and cyber threat aversion. Such a mechanism can ensure continuous operation of computing systems while reducing risks of system failures, thereby ensuring the safety of patients and patient data.

In various embodiments, the autonomous incident detection and response system provided by multi-stage AI model 110 can be employed in one or more medical devices. For example, as illustrated in FIG. 1, multi-stage AI model 110 can be comprised in system 102, wherein system 102 can be or can be employed in a medical device for AI-driven data recovery and cybersecurity. In this regard, in various embodiments, multi-stage AI model 110 can also enable medical devices to remain compliant with HIPAA by securing patient data and adhering to best practice frameworks such as the Center for Internet Security (CIS) security benchmark and/or other benchmarks. Additionally, in various embodiments, multi-stage AI model 110 can provide visualization dashboards via the UI of a device (e.g., desktop computer, laptop, tablet, smartphone, etc.) to provide a centralized view of enterprise level entities (e.g., hardware, software, machine, AI, neural network and/or users) and to provide permissions to identify any deviations and remediations to prevent PHI data breaches.

Figure 3:
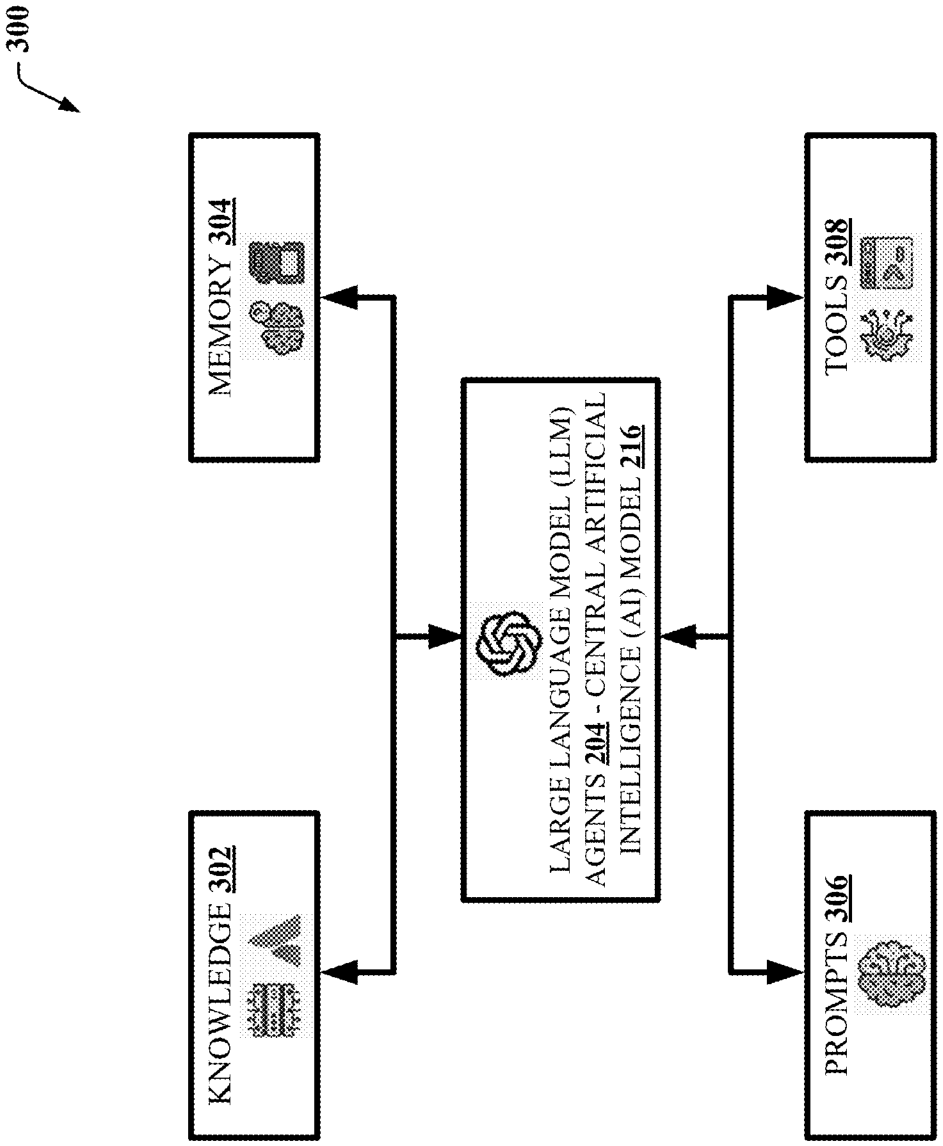
FIG. 3 illustrates a block diagram of an example, non-limiting system showing an overview of large language model (LLM) agents in accordance with one or more embodiments described herein.

FIG. 3 illustrates a block diagram of an example, non-limiting system 300 showing an overview of LLM agents in accordance with one or more embodiments described herein. Repetitive description of like elements and/or processes employed in respective embodiments is omitted for sake of brevity.

In various embodiments, respective LLM agents (i.e., ChatGPT-4o-assisted LLM agents, XGBoost-assisted LLM agents, and headless LLMs) of LLM agents 204 can employ knowledge 302 to perform the various operations described with reference to FIGS. 1 and 2. Knowledge 302 can be a RAG-assisted knowledge base of the Modality Software, and knowledge 302 can comprise error and incident documentations from forums/posts in Confluence™.

Additionally, LLM agents 204 can comprise memory 304. Memory 304 can comprise short-term memory and long-term memory. The short-term memory of an LLM agent can refer to the train of thought of the LLM agent that the LLM agent can employ to execute operations. For example, an LLM agent can access its short-term memory at any given time while monitoring data 120 to determine that all LLM agents of LLM agents 204 are involved in scanning data 120 to detect network traffic. If the LLM agent determines that no network traffic has been detected in a short time frame, the LLM agent can discard a record of the scan, clean up data associated with the discarded record and perform a fresh scan for network traffic. The long-term memory of an LLM agent can comprise an error remediation history. The error remediation history can refer to the complete history of error remediation, and the long-term memory can be employed by LLM agents 204 in conjunction with the RAG mechanism for data storage.

Prompts 306 can comprise auto-GPT styled self-prompts for monitoring, incident response, containment, data recovery, etc. Respective LLM agents of LLM agents 204 can initiate self-prompts for executing one or more operations. For example, upon detection of an anomaly, an LLM agent can initiate a self-prompt to execute operations based on detection of the anomaly.

Tools 308 can refer to internal tools employed by LLM agents 204 for information purposes. Tools 308 can comprise configuration management tools, bash shells, validation and verification scripts, etc. In one or more embodiments, one or more of tools 308 can be employed by LLM agents 204. For example, in an embodiment, LLM agents 204 can employ only validation and verification scripts since validation and verification are key operations involved in restoring computing systems affected by a cyberattack to a normal/healthy state, as described with reference to FIGS. 1 and 2.

Figure 4:
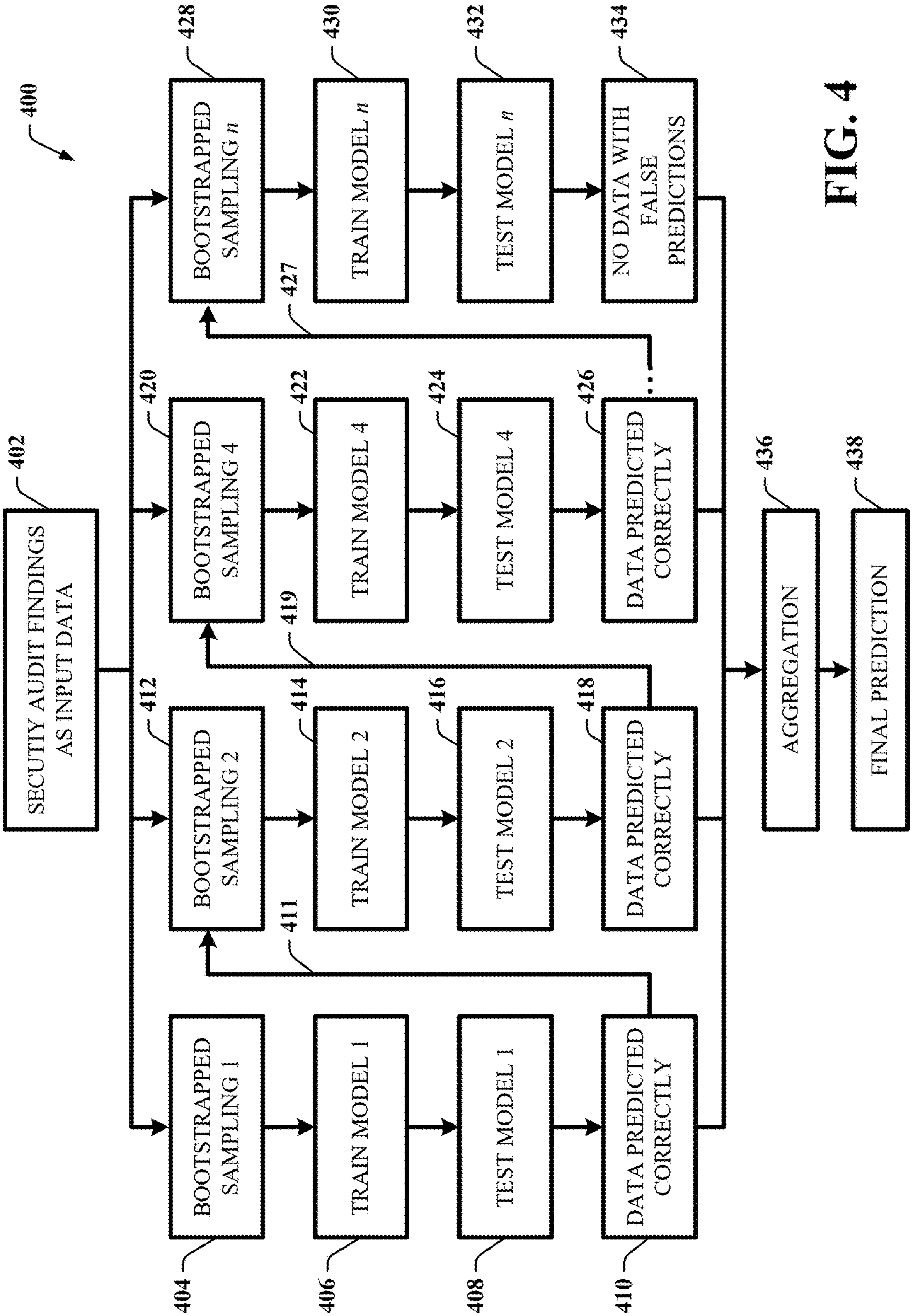
FIG. 4 illustrates a flow diagram of an example, non-limiting method that can be employed by an Extreme Gradient Boosting (XGBoost) algorithm in accordance with one or more embodiments described herein.

FIG. 4 illustrates a flow diagram of an example, non-limiting method 400 that can be employed by an XGBoost algorithm (or XGBoost algorithm) in accordance with one or more embodiments described herein. Repetitive description of like elements and/or processes employed in respective embodiments is omitted for sake of brevity.

Non-limiting method 400 describes an XGBoost algorithm flow that describes a workflow employed to train and test the XGBoost algorithm before deploying the XGBoost algorithm to execute the operations described with reference to FIGS. 1 and 2. Recall that in one or more embodiments, respective machine learning algorithms of machine learning algorithms 206 can be XGBoost algorithms that can be employed to detect an anomaly resulting from a cyberattack. In one or more embodiments, each XGBoost algorithm can be trained, bootstrapped, aggregated and employed to make final predictions such as, for example, predicting whether an event is an anomaly, predicting whether an action is to be reversed, determining whether to revert or restore a computing system from backup data, etc.

For example, at 402, security audit findings or data can be input to an XGBoost algorithm (e.g., by training component 214) as input data. The security audit data can be generated during a security audit performed by LLM agents 204, wherein LLM agents 204 can continuously monitor data 120 associated with one or more computing systems in a network to identify events that can potentially be anomalies resulting from a cyberattack. Data 120 can comprise network traffic, system logs, system access activities, etc. At 404, a first bootstrap sampling can be performed on the XGBoost algorithm. Bootstrap sampling refers to random selection of a subset of training data to construct each tree in an XGBoost algorithm. As a result, an XGBoost algorithm can be trained on diverse subsets of data. At 406, training component 214 can train the XGBoost algorithm, and at 408, training component 214 can test the XGBoost algorithm. At 410, training component 214 can analyze the predictions generated by the XGBoost algorithm during testing.

Based on the analysis, training component 214 can employ false predictions generated by the XGBoost algorithm during testing to repeat the training process. For example, at 412, training component 214 can perform a second bootstrap sampling based on the false predictions and the security audit data. Thereafter, training component 214 can retrain the XGBoost algorithm at 414, test the retrained XGBoost algorithm at 416, and analyze the predictions generated by the XGBoost algorithm during testing. The training process can be repeated (e.g., at 419 and 427) based on false predictions generated by the XGBoost algorithm during each testing cycle and the security audit data, as illustrated at 420, 422, 424 and 426, and additionally at 428, 430, 432 and 434. The training process can be repeated for n cycles until no data with false predictions is generated by the XGBoost algorithm during testing, as illustrated at 434. Finally, at 436, training component 214 can aggregate the correct predictions generated by the XGBoost algorithm at 410, 418, 426, 434, etc., and at 438 the XGBoost algorithm can be employed to generate final predictions such as detecting an anomaly, etc.

Figure 5:
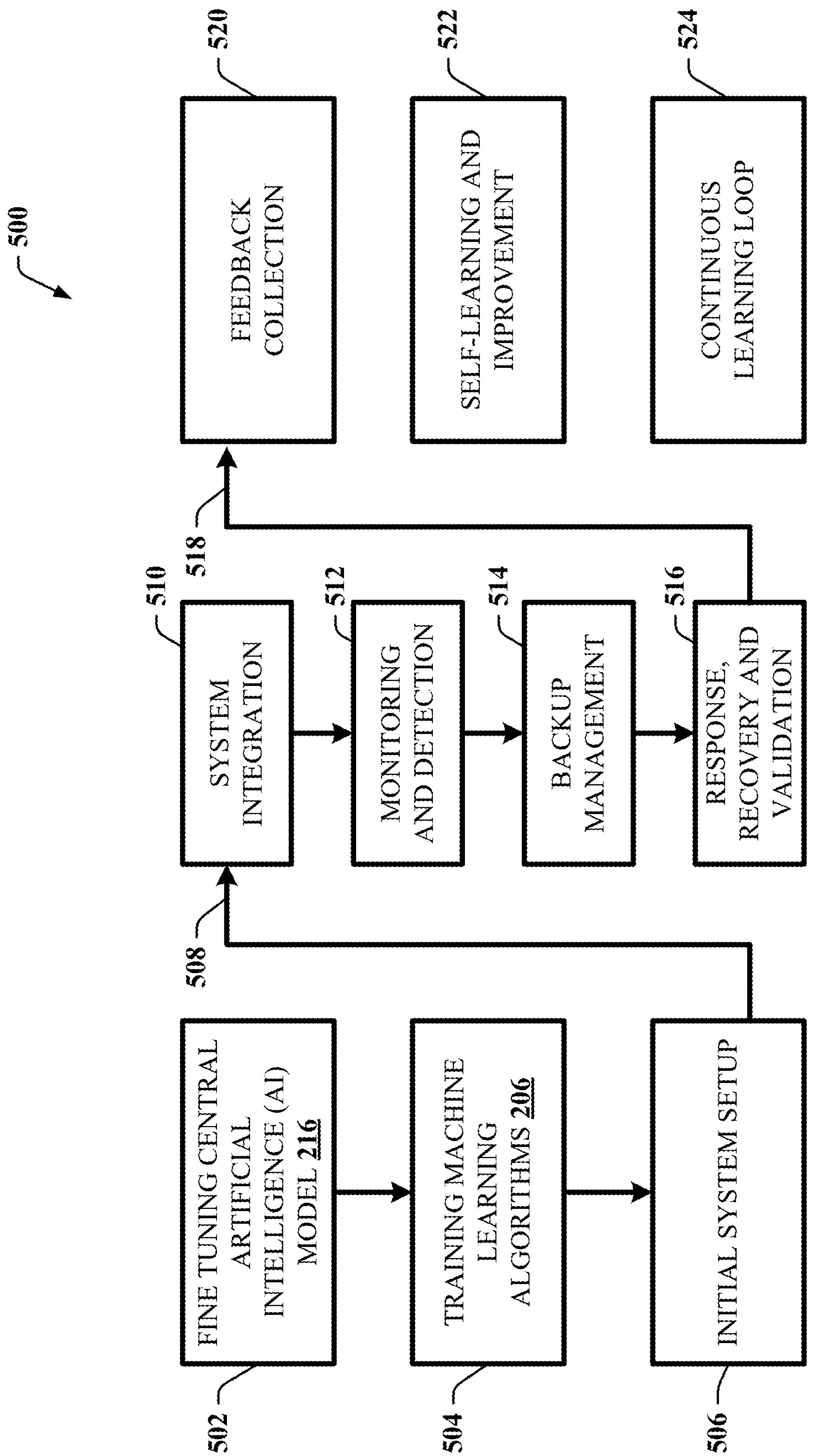
FIG. 5 illustrates a flow diagram of an example, non-limiting method that can be employed to implement a system that can detect cyberattacks and perform a data recovery mechanism upon detection of the cyberattacks in accordance with one or more embodiments described herein.

FIG. 5 illustrates a flow diagram of an example, non-limiting method 500 that can be employed to implement a system that can detect cyberattacks and perform a data recovery mechanism upon detection of the cyberattacks in accordance with one or more embodiments described herein. Repetitive description of like elements and/or processes employed in respective embodiments is omitted for sake of brevity.

With continued reference to FIGS. 1 and 2, non-limiting method 500 can be employed to implement multi-stage AI model 110 in a practical application. Non-limiting method 500 can be divided into three phases, wherein phase 1 can be a fine tuning and initial setup phase, phase 2 can be an integration and real-life implementation phase, and phase 3 can be a feedback and self-learning phase. Each phase of non-limiting method 500 is explained in terms of individual steps via the following paragraphs.

Phase 1: Fine Tuning and Initial Setup

At 502, non-limiting method 500 can comprise fine tuning (e.g., by training component 214) central AI model 216 (e.g., the ChatGPT-4o model or another suitable model). In various embodiments, fine tuning central AI model 216 can be preceded by data collection, wherein an entity (e.g., hardware, software, machine, AI, neural network and/or user) can gather diverse datasets relevant to healthcare (or another domain based on the application of multi-stage AI model 110), cyber threats, incident responses and disaster recovery. Such datasets can comprise historical cyberattack logs, medical system operation data, and patient data protection protocols. In some embodiments, the collected data can also comprise augmented data or simulated data derived from cyber threat and/or cyberattack scenarios identified by an LLM, such as a ChatGPT model, external to multi-stage AI model 110. The datasets thus collected can be employed by training component 214 to fine tune central AI model 216 such that central AI model 216 can be specialized for healthcare-specific cybersecurity tasks or for cybersecurity tasks related to domains such as finance, banking, etc. that can be partially applicable to healthcare to understand cyber threats and cyberattacks occurring across different domains. For healthcare-specific data, DICOM®, PHI data that can be encrypted, etc. can be identified to broaden the fine-tuning. As a result of the fine-tuning, central AI model 216 can understand/interpret data and generate responses for incident handling, data recovery, and system integrity checks.

At 504, non-limiting method 500 can comprise training (e.g., by training component 214) machine learning algorithms 206 (e.g., XGBoost algorithms). Training machine learning algorithms 206 can be preceded by data preprocessing, wherein training component 214 can preprocess training data collected for training machine learning algorithms 206. Preprocessing the training data can comprise cleaning, normalizing and splitting the training data into training and validation sets. Thereafter, training component 214 can train machine learning algorithms 206 for various tasks such as anomaly detection, impact analysis and integrity verification. While training machine learning algorithms 206 for a specific task, training component 214 can employ features relevant to the task to ensure high prediction accuracy and performance.

At 506, non-limiting method 500 can comprise performing an initial system setup by one or more entities (e.g., hardware, software, machine, AI, neural network and/or user). The initial system setup can comprise an infrastructure deployment stage that can further comprise setting up IT infrastructure including servers, storage systems and network configurations while ensuring secure and redundant storage solutions for backup data. The infrastructure deployment stage can be followed by an installation stage wherein software components such as, for example, the ChatGPT-4o model, LLM agents 204, XGBoost algorithms and RAG systems (i.e., set of AI models 212) can be installed (e.g., within a medical device) and configured (e.g., according to a medical device). At this stage, LLM agents assisted by/derived from ChatGPT-4o can be configured for specific roles such as monitoring, backup management and incident response execution to ensure that the LLM agents are correctly/properly integrated with other components of multi-stage AI model 110. As a final stage of the initial system setup, robust security measures can be implemented. Such security measures can comprise encryption of data for data storage, implementation of secure communication channels and implementation of access controls for system components. At 508, non-limiting method 500 can proceed to phase 2.

Phase 2: Integration and Real-Life Implementation

At 510, non-limiting method 500 can comprise system integration, wherein the components comprised in multi-stage AI model 110 can be integrated into a cohesive system (e.g., multi-stage AI model 110) to ensure seamless communication between the components (e.g., the ChatGPT-4o model, LLM agents 204, XGBoost algorithms and RAG systems). The multi-stage AI model 110 can be further integrated with the medical device. Thereafter, training component 214 can be employed to conduct functional testing, wherein training component 214 can conduct comprehensive testing of the integrated systems to ensure that the components of multi-stage AI model 110 operate in conjunction with one another as expected. Test scenarios employed to conduct the functional testing can include cyberattack simulations, data recovery processes and system integrity checks.

At 512, non-limiting method 500 can comprise monitoring and detection (e.g., by detection component 202). For example, multi-stage AI model 110 can deploy LLM agents 204 to continuously monitor network traffic, system logs and entity (e.g., user) behavior. Multi-stage AI model 110 can additionally employ machine learning algorithms 206 (e.g., XGBoost algorithms) to analyze, in real-time, security audit data resulting from the monitoring, to detect anomalies and predict cyber threats.

At 514, non-limiting method 500 can comprise backup management, wherein regular and incremental backups managed by LLM agents 204 can be implemented by multi-stage AI model 110. Backup management can ensure that data backups are encrypted and stored securely. Herein, the RAG mechanism can also be employed to validate the integrity of backup data by comparing the backup data with historical snapshots of the backup data.

Thus, LLM agents 204 can identify suspicious events through system logs or unusual entity behavior, and machine learning algorithms 206 can validate and identify such suspicious events as anomalies. In response to validation by machine learning algorithms 206 that an event is an anomaly, backup management can be triggered, and backup files can be restored from backup data.

At 516, non-limiting method 500 can comprise generating responses and performing validation and recovery of data based on backup data. For example, in the event of a cyber threat, an incident response can be initiated, wherein central AI model 216 (e.g., the ChatGPT-4o model) can coordinate automated incident response actions. Accordingly, LLM agents 204 can execute predefined containment measures such as virtual patching and network segmentation based on guidance from machine learning algorithms 206 (e.g., XGBoost algorithms). Thereafter, central AI model 216 can initiate a data recovery process by leveraging LLM agents 204 to execute recovery tasks. Additionally, the RAG mechanism provided by the set of AI models 212 can be employed to retrieve optimal recovery procedures, and machine learning algorithms 206 can perform a post-recovery integrity verification of the recovered data. Finally, system validation can be performed, wherein the computing system affected by the cyberattack and restored by employing the backup data can be validated. For example, restored computing systems can be gradually rebooted and validated under oversight from the central AI model 216. Additionally, LLM agents 204 can conduct comprehensive tests to ensure that the recovered systems meet operational standards, and the RAG mechanism can aid in comparing the restored computing systems against historical benchmarks. At 518, non-limiting method 500 can proceed to phase 3.

Phase 3: Feedback and Self-Learning Phase

At 520, non-limiting method 500 can comprise feedback collection, wherein incident data can be collected as feedback. For example, multi-stage AI model 110 can collect detailed data related to all incidents, including cyber threats detected by detection component 202, actions executed in response to detection of the cyber threats and recovery outcomes. The collected data can be securely stored in a memory (e.g., memory 106) for analysis and future reference. Further, multi-stage AI model 110 continuously monitor and collect performance metrics for the various components comprised in multi-stage AI model 110, including monitoring the accuracy of anomaly detection by detection component 202, the success rates of data recovery processes and system uptime. The feedback and scenarios thus collected can be input to the RAG mechanism provided by the set of AI models 212. When fine tuning central AI model 216, collecting data or employing the RAG mechanism, the system (i.e., multi-stage AI model 110) can automatically and intelligently extract the correct solutions and automated recovery scripts.

At 522, non-limiting method 500 can comprise self-learning and improvement. In various embodiments, training component 214 can perform model retraining, wherein training component 214 can employ the collected incident data and performance metrics to regularly retrain machine learning algorithms 206 (e.g., XGBoost algorithms). Such retraining can refine the accuracy of machine learning algorithms 206 and adapt machine learning algorithms 206 to new threat patterns. In various embodiments, training component 214 can also periodically update and retrain central AI model 216 (e.g., the ChatGPT-4o model) with new data to improve the decision-making capabilities of central AI model 216. Training component 214 can incorporate feedback from real-life incidents to enhance the response strategies adopted by central AI model 216 in case of cyberattack detection. The self-learning and improvement step can also comprise system optimization, wherein an entity (e.g., hardware, software, machine, AI, neural network and/or user), for example, training component 214, can analyze the performance of multi-stage AI model 110, identify areas for performance improvement, implement updates and optimizations to enhance system efficiency, reduce false positives/negatives and improve overall resilience of multi-stage AI model 110.

At 524, non-limiting method 500 can comprise executing (e.g., by multi-stage AI model 110) a continuous learning loop. The continuous learning loop can comprise a feedback integration stage, wherein multi-stage AI model 110 can integrate feedback, for example, from healthcare professionals and IT staff into a self-learning loop, and the feedback can be employed to fine tune (e.g., via training component 214) algorithms (or models) comprised in multi-stage AI model 110 to improve the usability and effectiveness of multi-stage AI model 110. The continuous learning loop can further comprise a regular review stage, wherein training component 214 can conduct regular reviews of the system performance and security posture of multi-stage AI model 110. Training component 214 can update and refine response protocols based on new insights and evolving cyber threat landscapes identified as a result of the reviews. Finally, the continuous learning loop can comprise an adaption stage, wherein the system (i.e., multi-stage AI model 110) can continuously adapt itself to new types of cyber threats by incorporating the latest intelligence on cyber threats and cybersecurity best practices.

Figure 6:
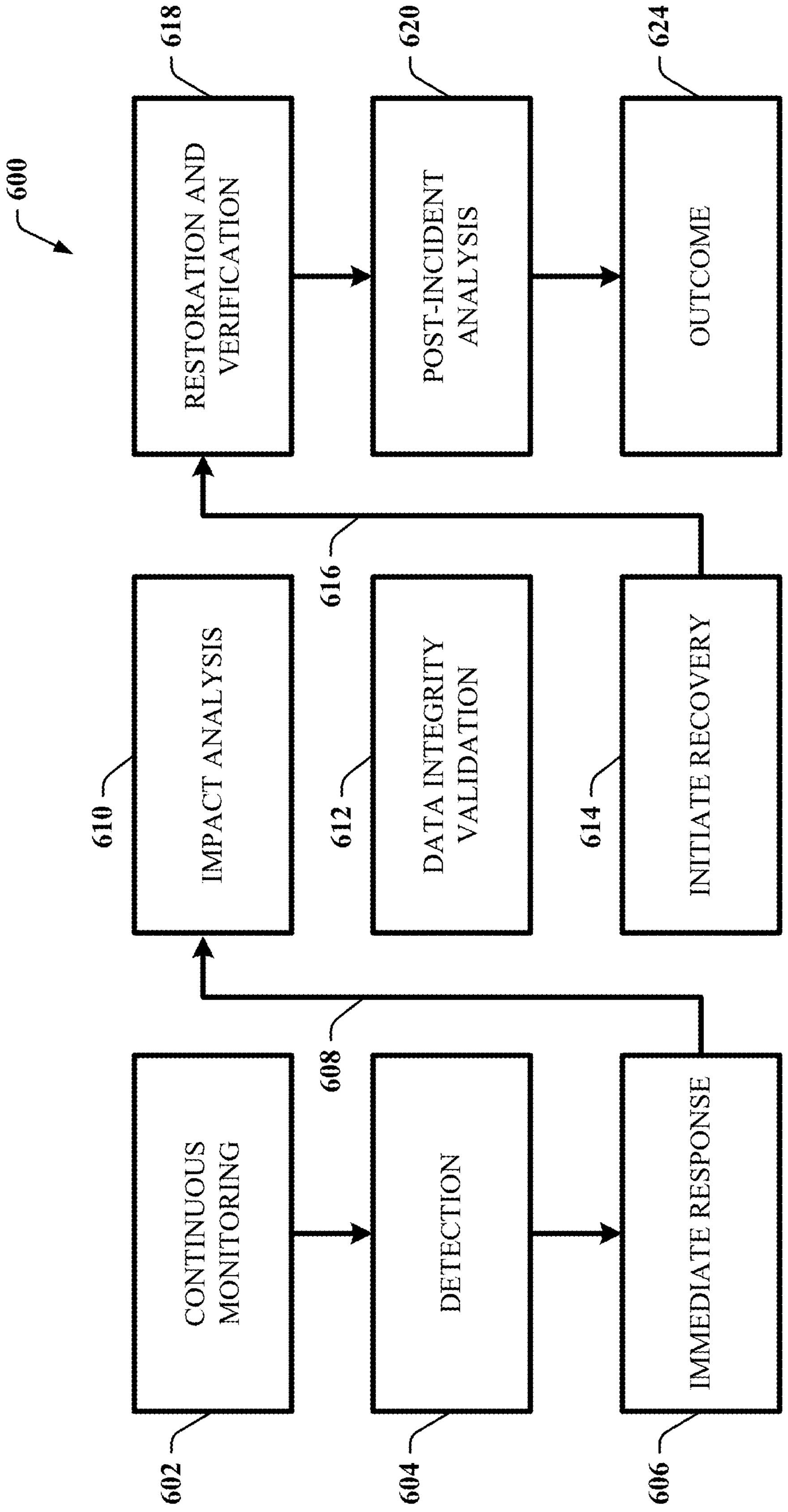
FIG. 6 illustrates a flow diagram of an example, non-limiting method that can be employed for intelligent data backup and recovery in case of a ransomware attack in accordance with one or more embodiments described herein.
Figure 7:
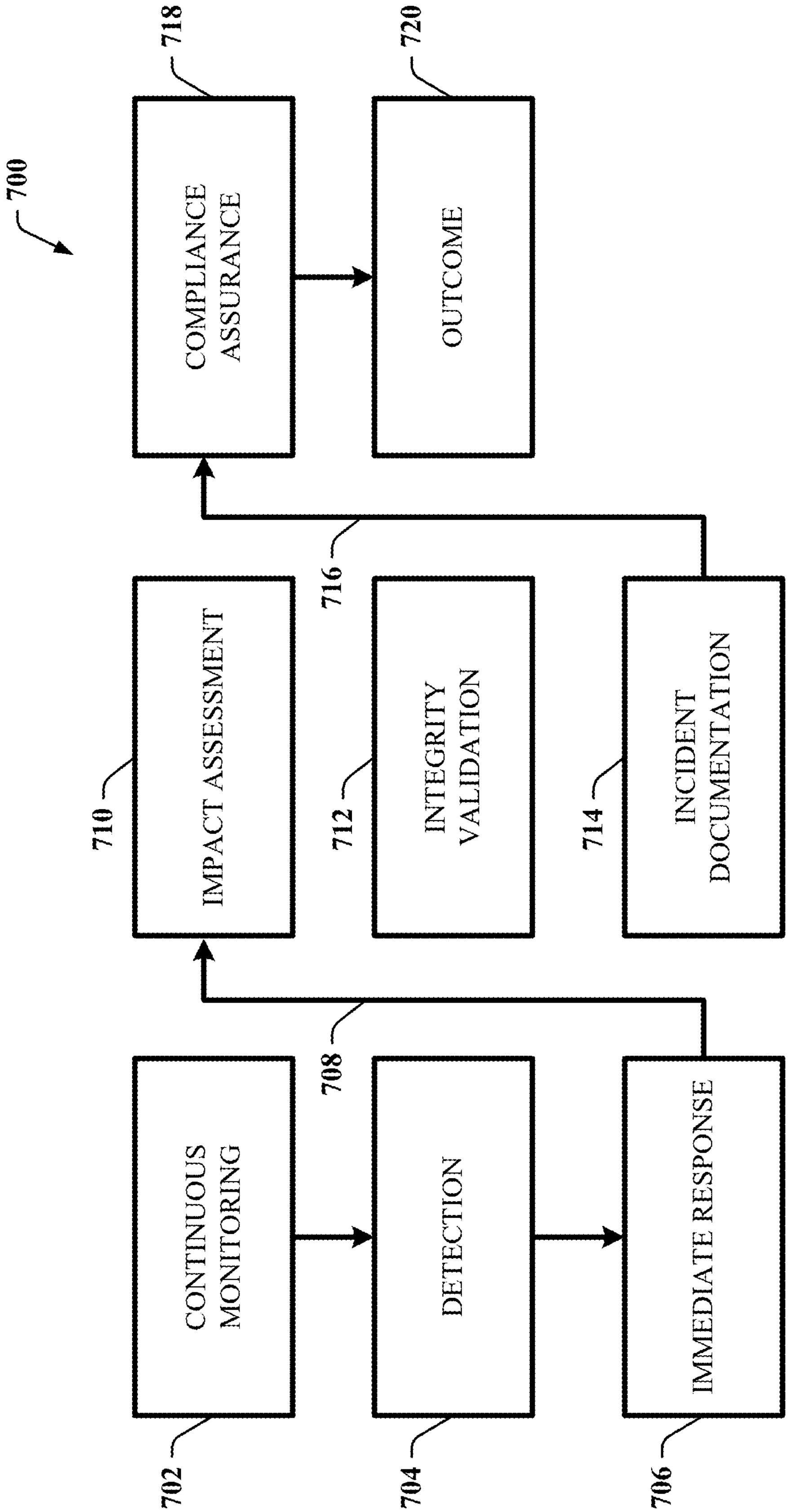
FIG. 7 illustrates a flow diagram of an example, non-limiting method that can be employed for secure data access and confidentiality assurance in case of an unauthorized access attempt in accordance with one or more embodiments described herein.

FIGS. 6 and 7 are intended to describe practical applications of the various embodiments disclosed herein.

FIG. 6 illustrates a flow diagram of an example, non-limiting method 600 that can be employed for intelligent data backup and recovery in case of a ransomware attack in accordance with one or more embodiments described herein. Repetitive description of like elements and/or processes employed in respective embodiments is omitted for sake of brevity.

With continued reference to FIG. 1-5, non-limiting method 600 illustrates an example, non-limiting application of multi-stage AI model 110. For example, the electronic health record (EHR) system of a hospital can employ system 102 for AI-driven data recovery and cybersecurity. If the hospital's EHR system is targeted by a ransomware attack, then multi-stage AI model 110 can encrypt patient data and deny access to entities (e.g., hardware, software, machine, AI, neural network and/or user) attempting to access the EHR system during critical system operations. An advantage of the various embodiments described herein can be that a ransomware attacker can be entirely unaware that their attack has been detected and stopped.

For example, system 102 can integrate the ChatGPT-4o model (i.e., central AI model 216) with LLM agents 204 for autonomous detection, response and recovery, wherein some LLM agents of LLM agents 204 can be enabled/assisted by XGBoost algorithms. In this exemplary scenario, LLM agents 204 can continuously monitor network traffic and subsequently detect unusual encryption activities. In response to detection of such unusual encryption activities, LLM agents 204 can trigger immediate response protocols. Accordingly, the ChatGPT-4o model can coordinate the actions to be executed by the various components of multi-stage AI model, isolate EHR systems affected by the ransomware attack, and prevent the spread of ransomware. Additionally, XGBoost algorithms (i.e., machine learning algorithms 206) can analyze the impact of the ransomware attack and identify the data compromised by ransomware. The RAG mechanism provided by the set of AI models 212 can assist in validating integrity of backup data, and LLM agents 204 can initiate data recovery from secure, encrypted backups, restore EHR system functionality as soon as possible, and ensure minimal operational disruptions to the EHR system while maintaining continuity in patient care.

More specifically, at 602 of non-limiting method 600, LLM agents enabled by XGBoost algorithms can continuously monitor network traffic, system logs, and entity activities. The XGBoost algorithms can analyze historical data patterns and detect anomalies indicative of ransomware attacks. At 604 of non-limiting method 600, LLM agents 204 can detect unusual encryption activities such as rapid file modifications and unauthorized access attempts. Based on the detection, LLM agents 204 can trigger an immediate alert to the ChatGPT-4o model to notify the ChatGPT-4o model of the activities thus detected. At 606 of non-limiting method 600, the ChatGPT-4o model can generate an immediate response, wherein the ChatGPT-4o model can coordinate response protocols and isolate EHR systems (e.g., via isolation component 208) affected by the ransomware attack to prevent further spread of ransomware. Additionally, LLM agents 204 can execute containment procedures and disconnect compromised EHR systems from the network. At 608, non-limiting method 600 can proceed to impact analysis, wherein the XGBoost algorithms can analyze the impact of the ransomware attack and identify the data impacted by the ransomware attack based on the RAG mechanism.

At 610 of non-limiting method 600, XGBoost algorithms can analyze the impact of the ransomware attack, identify the extent of data encryption and identify specific compromised data segments. Further, the XGBoost algorithms can generate a comprehensive impact analysis report highlighting the data and EHR systems affected by the ransomware attack. At 612 of non-limiting method 600, the RAG mechanism can assist multi-stage AI model 110 in validating integrity of backup data by comparing the current state of the backup data with historical backups. This can ensure that the backup data is untainted and ready for recovery of the affected EHR systems. Additionally, the RAG mechanism can validate how ransomware attacks have been handled in the past and immediately trigger a data recovery process. At 614 of non-limiting method 600, LLM agents 204 can initiate a data recovery process from the secure and encrypted backups. The ChatGPT-4o model can oversee the restoration of the EHR systems and prioritize critical data and EHR systems to minimize operational disruptions. At 616, non-limiting method 600 can proceed to restoration and verification.

At 618 of non-limiting method 600, LLM agents 204 can verify the functionality of the restored EHR systems and ensure complete recovery of encrypted data. LLM agents 204 can also perform additional checks to validate system integrity and functionality. At 620 of non-limiting method 600, a post-incident analysis can be performed, wherein LLM agents 204 can generate a detailed incident report outlining the attack vector, response actions and recovery outcomes. Thereafter, LLM agents 204 can feed the detailed report back into multi-stage AI model 110 to improve future detection and response capabilities. At 624 of non-limiting method 600, the EHR systems affected by the ransomware attack can be promptly restored with minimal operational disruptions. Thus, continuity of patient care can be maintained and trust in the hospital's data management can be upheld.

FIG. 7 illustrates a flow diagram of an example, non-limiting method 700 that can be employed for secure data access and confidentiality assurance in case of an unauthorized access attempt in accordance with one or more embodiments described herein. Repetitive description of like elements and/or processes employed in respective embodiments is omitted for sake of brevity.

With continued reference to FIG. 1-5, non-limiting method 700 illustrates an example, non-limiting application of multi-stage AI model 110. For example, hospital A's picture archiving and communication system (PACS) can be integrated with system 102, and system 102 can detect an unauthorized access attempt that can risk patient data confidentiality.

For example, LLM agents 204 can continuously monitor access logs and detect real-time access attempts that are unauthorized. Based on detection of such access attempts, XGBoost algorithms (i.e., machine learning algorithms 206) can be directed to the task of auditing access behavior, and the XGBoost algorithms can pinpoint access attempts that can potentially constitute a data breach. The ChatGPT-4o model (i.e., central AI model 216) can orchestrate the PACS system response. For example, LLM agents 204 can block unauthorized access and subsequently log incident details. The RAG mechanism can assist in verification of system integrity via differences (diffs) data with backups and ensure that no data tampering of the backup data has occurred. Such a continuous monitoring and immediate response mechanism can support and ensure security of patient data, maintain confidentiality, ensure trust in a healthcare institution's data management practices, and ensure that the healthcare institution complies with HIPAA regulations.

More specifically, at 702 of non-limiting method 700, LLM agents can continuously monitor access logs, entity behavior and system activities, and XGBoost algorithms can audit access patterns and establish baseline behaviors for entities (e.g., hardware, software, machine, AI, neural network and/or user). At 704 of non-limiting method 700, LLM agents 204 can detect unauthorized access attempts in real-time. LLM agents 204 can be triggered to detect such access attempts based on deviations such as an access from unknown internet protocol (IP) addresses, atypical access times and abnormal data access volumes. Upon detection of such access attempts, LLM agents 204 can send an immediate alert to the ChatGPT-4o model, detailing the suspicious activities. At 706 of non-limiting method 700, the ChatGPT-4o model can orchestrate an immediate system response, thereby initiating (e.g., via isolation component 208) an immediate lockdown of the unauthorized access point. Additionally, LLM agents 204 can block unauthorized access, record incident details for further analysis and update access control links (ACLs) to prevent similar attempts in the future. At 708, non-limiting method 700 can proceed to impact assessment.

At 710 of non-limiting method 700, the XGBoost algorithms can assess the potential impact identifying access data, potential data breaches and compromised accounts. Accordingly, the XGBoost algorithms can utilize advanced analytics to understand the scope of the unauthorized access, and the XGBoost algorithms can generate a detailed impact analysis report highlighting sensitive data at risk. At 712 of non-limiting method 700, the RAG framework provided by the set of AI models 212 can assist in verifying system integrity by comparing a current/existing state of backup data with secure historical backups. For example, the RAG mechanism can validate authenticity of the backup data through cryptographic checks and secure hash algorithms. This can ensure that no tampering of backup data has occurred. At 714 of non-limiting method 700, LLM agents 204 can comprehensively document the incident of the unauthorized access attempt and generate detailed logs for compliance and auditing purposes. Further, LLM agents 204 can analyze the incident details and insights employed to enhance security measures, thereby ensuring continuous improvement of the threat detection and response capabilities of the AI (e.g., multi-stage AI model 110). At 716, non-limiting method 700 can proceed to compliance assurance.

At 718 of non-limiting method 700, multi-stage AI model 110 can ensure compliance with HIPAA regulations by maintaining detailed logs and securing patient data. Additionally, regular audits can be performed to verify adherence of multi-stage AI model 110 to security protocols and to demonstrate regulatory compliance. At 720 of non-limiting method 700, multi-stage AI model 110 can thwart unauthorized access to the PACS system, thereby ensuring patient data confidentiality. As a result, trust in hospital A's data management practices can be upheld, hospital A can maintain compliance with regulatory standards and the institution's commitment to data security can be reinforced.

Figure 8:
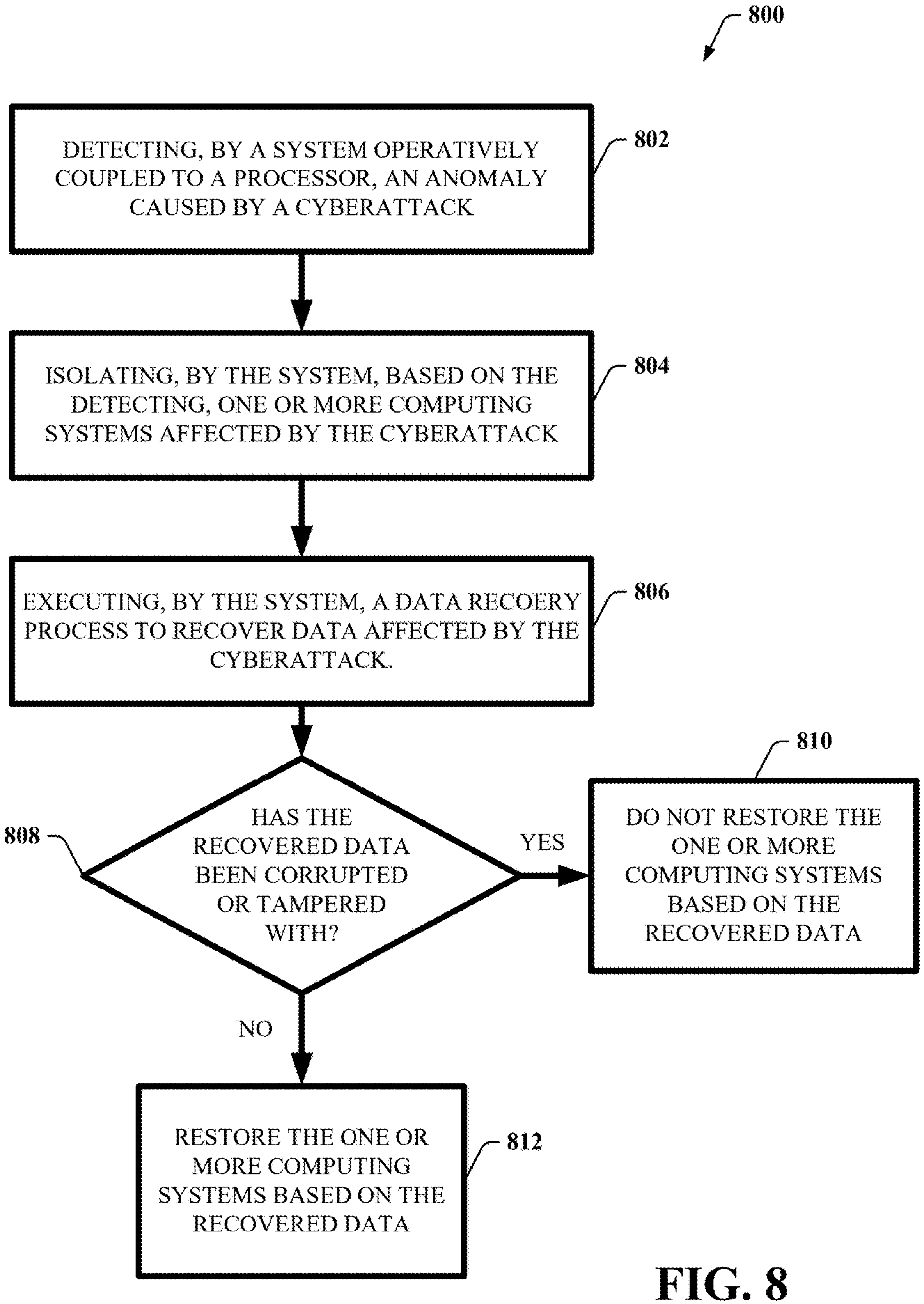
FIG. 8 illustrates a flow diagram of an example, non-limiting method that can detect cyberattacks and perform a data recovery mechanism upon detection of the cyberattacks in accordance with one or more embodiments described herein.

FIG. 8 illustrates a flow diagram of an example, non-limiting method 800 that can detect cyberattacks and perform a data recovery mechanism upon detection of the cyberattacks in accordance with one or more embodiments described herein. Repetitive description of like elements and/or processes employed in respective embodiments is omitted for sake of brevity.

At 802, non-limiting method 800 can comprise detecting (e.g., by detection component 202), by a system operatively coupled to a processor, an anomaly caused by a cyberattack.

At 804, non-limiting method 800 can comprise isolating (e.g., by isolation component 208), by the system, based on the detecting, one or more computing systems affected by the cyberattack.

At 806, non-limiting method 800 can comprise executing (e.g., by LLM agents 204), by the system, a data recovery process to recover data affected by the cyberattack.

At 808, non-limiting method 800 can comprise determining (e.g., by LLM agents 204), by the system, whether the recovered data has been corrupted or tampered with.

If yes, at 810, non-limiting method 800 can comprise not restoring the one or more computing systems based on the recovered data. In some embodiments, the corrupted backup data can be replaced with secure and uncorrupted secondary backup data prior to restoring the one or more computing systems based on the backup data.

If not, at 812, non-limiting method 800 can comprise restoring the one or more computing systems based on the recovered data.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)=\text{confidence}(\text{class})$. Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

Figure 9:
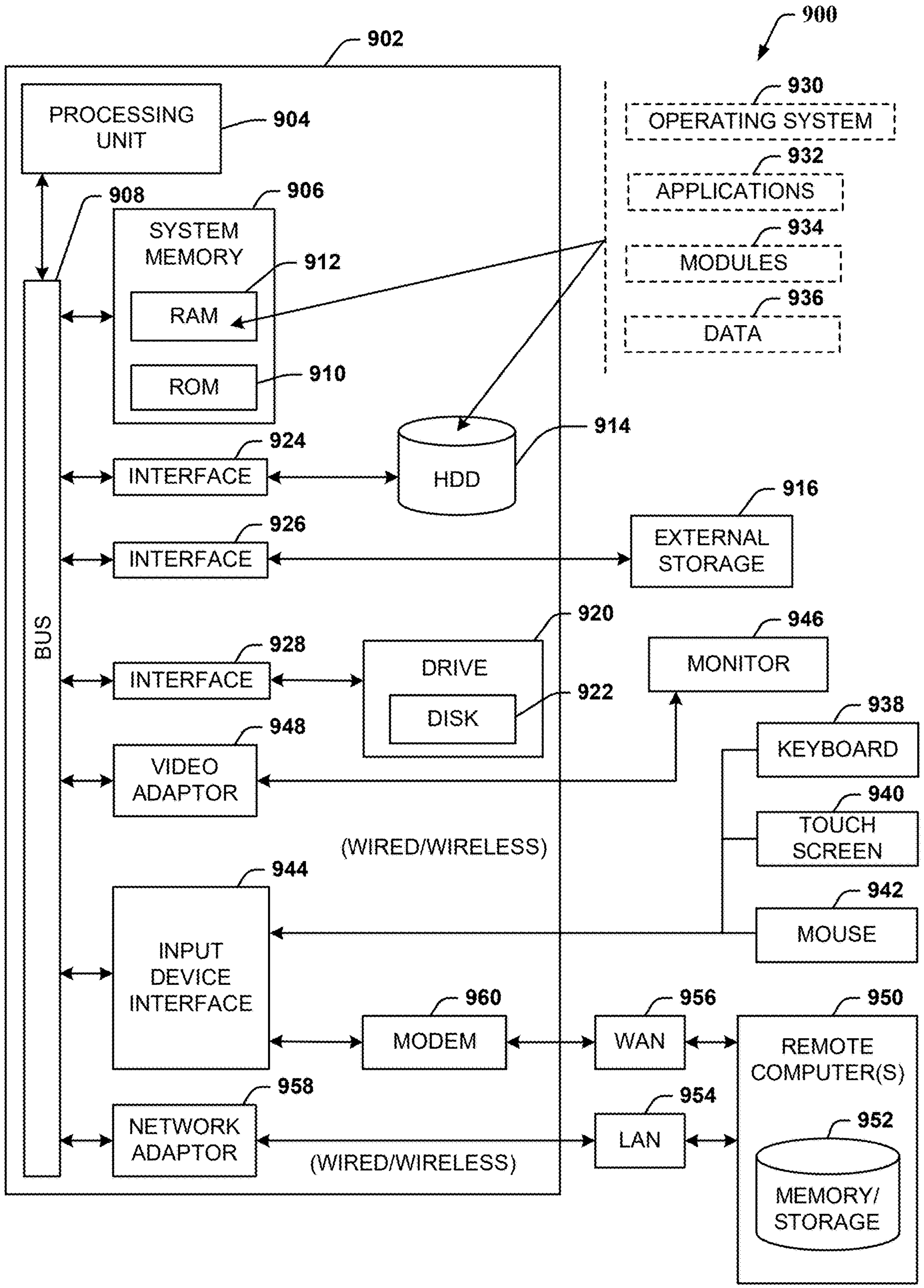
FIG. 9 illustrates a block diagram of an example, non-limiting operating environment in which one or more embodiments described herein can be facilitated.

In order to provide additional context for various embodiments described herein, FIG. 9 and the following discussion are intended to provide a brief, general description of a suitable computing environment 900 in which the various embodiments described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and a drive 920, e.g., such as a solid state drive, an optical disk drive, which can read or write from a disk 922, such as a CD-ROM disc, a DVD, a BD, etc. Alternatively, where a solid state drive is involved, disk 922 would not be included, unless separate. While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the OS kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above, such as but not limited to a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
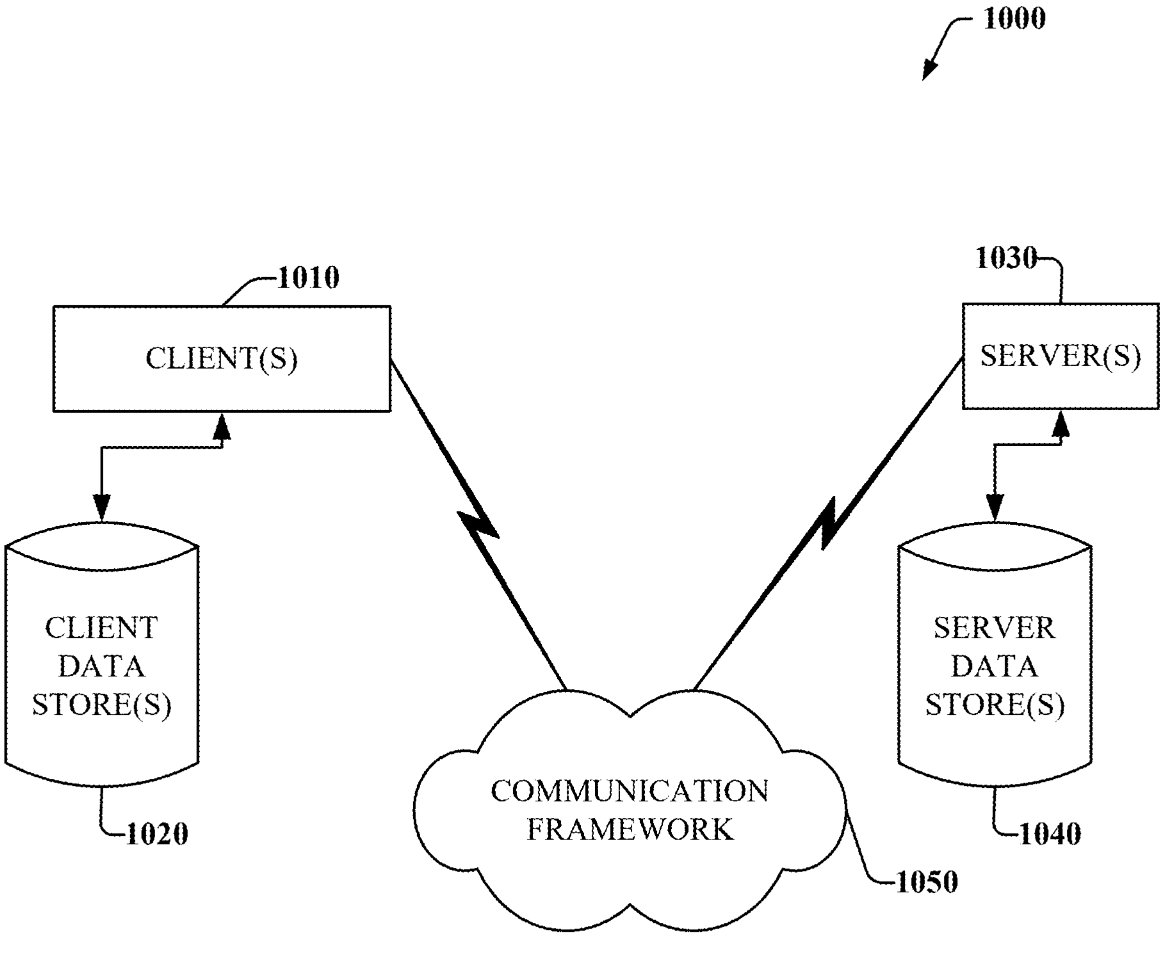
FIG. 10 illustrates an example networking environment operable to execute various implementations described herein.

FIG. 10 is a schematic block diagram of a sample computing environment 1000 with which the disclosed subject matter can interact. The sample computing environment 1000 includes one or more client(s) 1010. The client(s) 1010 can be hardware or software (e.g., threads, processes, computing devices). The sample computing environment 1000 also includes one or more server(s) 1030. The server(s) 1030 can also be hardware or software (e.g., threads, processes, computing devices). The servers 1030 can house threads to perform transformations by employing one or more embodiments as described herein, for example. One possible communication between a client 1010 and a server 1030 can be in the form of a data packet adapted to be transmitted between two or more computer processes. The sample computing environment 1000 includes a communication framework 1050 that can be employed to facilitate communications between the client(s) 1010 and the server(s) 1030. The client(s) 1010 are operably connected to one or more client data store(s) 1020 that can be employed to store information local to the client(s) 1010. Similarly, the server(s) 1030 are operably connected to one or more server data store(s) 1040 that can be employed to store information local to the servers 1030.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a memory that stores computer executable components; and a processor that executes the computer executable components stored in the memory, wherein the computer executable components comprise a multi-stage artificial intelligence (AI) model, the multi-stage AI model comprising:

a detection component comprising large language model (LLM) agents and machine learning algorithms, wherein the LLM agents:

perform a security audit by continuously monitoring network traffic, system logs, and system access activities associated with one or more computing systems; and generate structured audit outputs comprising semantic indicators of system behavior and potential security events based on the monitored data, and the machine learning algorithms detect an anomaly caused by a cyberattack by analyzing data generated during the security audit; and an isolation component that isolates, based on detection of the anomaly, one or more computing systems affected by the cyberattack.

2. The system of claim 1, wherein the detection component comprises:

large language model (LLM) agents that perform a security audit, wherein the LLM agents continuously monitor network traffic, system logs and system access activities for the one or more computing systems.

3. The system of claim 2, wherein the detection component further comprises:

machine learning algorithms that detect the anomaly by analyzing data generated during the security audit.

4. The system of claim 2, wherein the LLM agents further:

detect, based on the detection of the anomaly, one or more cyberattack activities causing the anomaly; and generate, based on detection of the one or more cyberattack activities, an alert.

5. The system of claim 4, wherein the isolation component isolates, based on the alert, the one or more computing systems from additional computing systems in a network to prevent the cyberattack from spreading throughout the network.

6. The system of claim 3, wherein the machine learning algorithms further:

analyze an impact of the cyberattack on the one or more computing systems; and generate an impact analysis report that highlights the impact of the cyberattack.

7. The system of claim 6, further comprising:

a validation component that validates, based on the impact analysis report, integrity of backup data, wherein the validation component employs a set of AI models that further employ Retrieval-Augmented generation (RAG) to validate the integrity of backup data.

8. The system of claim 7, wherein the LLM agents further:

execute a data recovery process based on the backup data, upon validation of integrity of the backup data, wherein the data recovery process is executed while minimizing operational disruptions caused by the cyberattack;

recover data affected by the cyberattack; and restore the one or more computing systems to a healthy state.

9. The system of claim 7, further comprising:

a central AI model that controls operations of the LLM agents, the machine learning algorithms and the set of AI models.

10. The system of claim 8, further comprising:

a training component that trains the LLM agents, the machine learning algorithms and the set of AI models.

11. A computer-implemented method, comprising:

performing, by a system operatively coupled to a processor, a security audit of one or more computing systems using large language model (LLM) agents, the security audit comprising continuously monitoring network traffic, system logs, and system access activities associated with the one or more computing systems;

generating structured audit outputs comprising semantic indicators of system behavior and potential security events based on the monitored data;

detecting, by the system, using one or more machine learning algorithms that analyze data generated during the security audit, an anomaly caused by a cyberattack; and isolating, by the system, based on the detecting, one or more computing systems affected by the cyberattack from additional computing systems in a network.

12. The computer-implemented method of claim 11, further comprising:

performing, by the system, the security audit by continuously monitoring network traffic, system logs and system access activities for the one or more computing systems.

13. The computer-implemented method of claim 12, further comprising:

detecting, by the system, the anomaly by analyzing data generated during the security audit.

14. The computer-implemented method of claim 11, further comprising:

detecting, by the system, based on the detection of the anomaly, one or more cyberattack activities causing the anomaly; and generating, by the system, based on detection of the one or more cyberattack activities, an alert.

15. The computer-implemented method of claim 14, further comprising:

the isolating, by the system, based on the alert, the one or more computing systems from additional computing systems in a network to prevent the cyberattack from spreading throughout the network.

16. The computer-implemented method of claim 11, further comprising:

analyzing, by the system, an impact of the cyberattack on the one or more computing systems; and generating, by the system, an impact analysis report that highlights the impact of the cyberattack.

17. The computer-implemented method of claim 16, further comprising:

employing, by the system, Retrieval-Augmented generation (RAG) to validate, based on the impact analysis report, integrity of backup data.

18. The computer-implemented method of claim 17, further comprising:

executing, by the system, a data recovery process based on the backup data, upon validation of integrity of the backup data, wherein the data recovery process is executed while minimizing operational disruptions caused by the cyberattack;

recovering, by the system, data affected by the cyberattack; and restoring, by the system, the one or more computing systems to a healthy state.

19. A computer program product comprising a non-transitory computer readable memory having program instructions embodied therewith, the program instructions executable by a processor to cause the processor to:

perform a security audit of one or more computing systems using large language model (LLM) agents that continuously monitor network traffic, system logs, and system access activities associated with the one or more computing systems;

generate structured audit outputs comprising semantic indicators of system behavior and potential security events based on the monitored data;

detect, based on analysis of data generated during the security audit using one or more machine learning algorithms, an anomaly caused by a cyberattack; and isolate, based on detection of the anomaly, one or more computing systems affected by the cyberattack from additional computing systems in a network.

20. The computer program product of claim 19, wherein the program instructions are further executable by the processor to cause the processor to:

detect, based on the detection of the anomaly, one or more cyberattack activities causing the anomaly;

generate, based on detection of the one or more cyberattack activities, an alert; and isolate, based on the alert, the one or more computing systems from additional computing systems in a network to prevent the cyberattack from spreading throughout the network.

* * * * *